(12) United States Patent
Hamilton et al.

(10) Patent No.: US 8,554,497 B2
(45) Date of Patent: Oct. 8, 2013

(54) FIRE HOSE TESTING APPARATUS AND METHOD

(75) Inventors: David Hamilton, Erie, PA (US); Dennis Zeiber, Erie, PA (US)

(73) Assignee: Fire Catt LLC, Troy, MI (US)

( * ) Notice: Subject to any disclaimer, the term of this patent is extended or adjusted under 35 U.S.C. 154(b) by 536 days.

(21) Appl. No.: 12/057,342

(22) Filed: Mar. 27, 2008

(65) Prior Publication Data

US 2009/0248324 A1   Oct. 1, 2009

(51) Int. Cl.
*G01F 1/00* (2006.01)

(52) U.S. Cl.
USPC ............... 702/47; 702/51; 702/50; 702/82; 73/37; 73/40; 73/40.5 R

(58) Field of Classification Search
USPC ............ 702/47, 51, 50, 82; 73/37, 40, 40.5 R
See application file for complete search history.

(56) References Cited

U.S. PATENT DOCUMENTS

| | | | |
|---|---|---|---|
| 4,167,868 A | | 9/1979 | Bobo |
| 4,599,890 A | * | 7/1986 | Girone et al. ............ 73/37 |
| 5,297,736 A | * | 3/1994 | Vickery ................. 239/122 |
| 5,339,677 A | | 8/1994 | Haug |
| 6,783,328 B2 | * | 8/2004 | Lucke et al. .............. 417/43 |
| 6,934,644 B2 | * | 8/2005 | Rogers et al. ............ 702/55 |
| 2003/0078751 A1 | * | 4/2003 | Juhasz .................. 702/114 |
| 2005/0268968 A1 | * | 12/2005 | Hourtouat ............... 137/492 |
| 2008/0059082 A1 | * | 3/2008 | Morrison ................. 702/34 |
| 2009/0087319 A1 | * | 4/2009 | Russold et al. ........... 417/45 |

FOREIGN PATENT DOCUMENTS

EP       1369679 A2 * 12/2003

OTHER PUBLICATIONS

Pump school tutorial, "When to use a positive displacement pump," 2007.*
eCircuit Center tutorial, "PID controller," 2002.*
Bormann, EP 1369679 A2—English translated version (Machine translated).*
Parker, "Positive displacement pumps-performance and application," Proceedings of 11th International Pump Users Symposium (1994).*
eCircuit Center, "PID controller" (2002).*
NFPA 1962, "Standard for the care, use and service testing of fire hose including couplings and nozzles," (1992).*
Elastic potential energy (1999).*

* cited by examiner

*Primary Examiner* — Sujoy Kundu
*Assistant Examiner* — Hyun Park
(74) *Attorney, Agent, or Firm* — Woodling, Krost and Rust

(57) ABSTRACT

A method for testing a plurality of fire hoses having respective service test pressures and the test apparatus therefor wherein each hose is required to maintain a test pressure for a specified duration to pass the test. The test pressure is proportional to the service test pressure. Each hose is coupled to a respective hose fitting of a respective branch test conduit. Each branch test conduit includes an isolation valve, a pressure transducer, and a hose fitting downstream of the isolation valve. A variable frequency-variable speed controls a motor which drives a positive displacement water pump supplying water to and pressurizing a water header conduit and a plurality of branch test conduits interconnected therewith. An algorithm applied to the error signal for a respective hose line generates a pump speed command limited by the controller to regulate the rate of increase of pump output pressure.

2 Claims, 14 Drawing Sheets

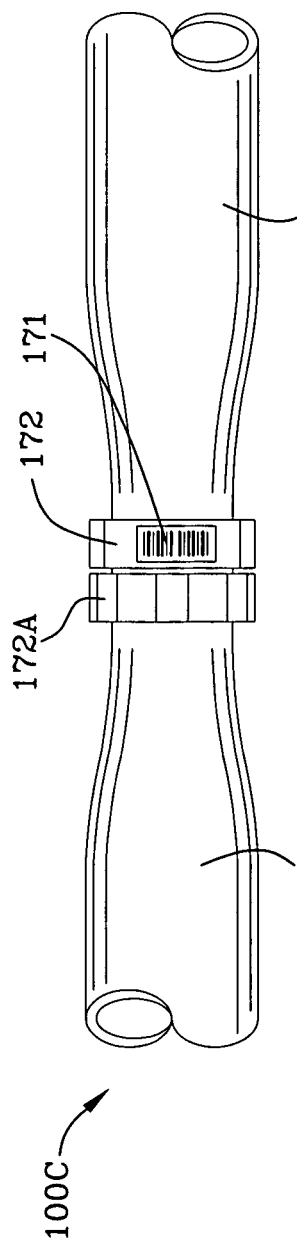
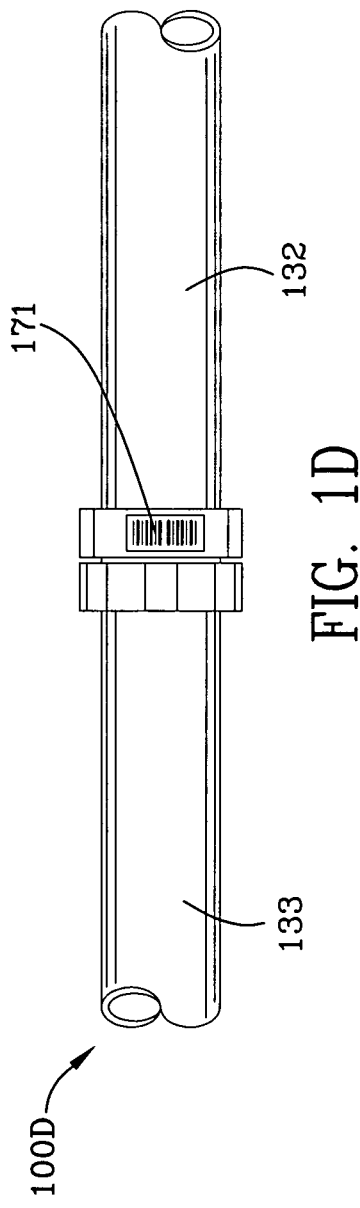
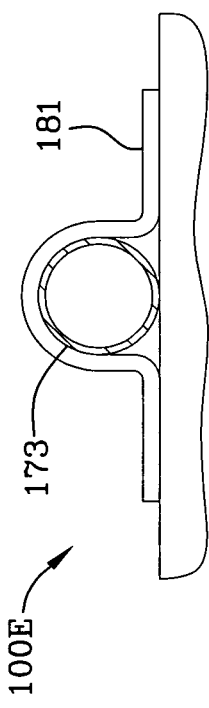

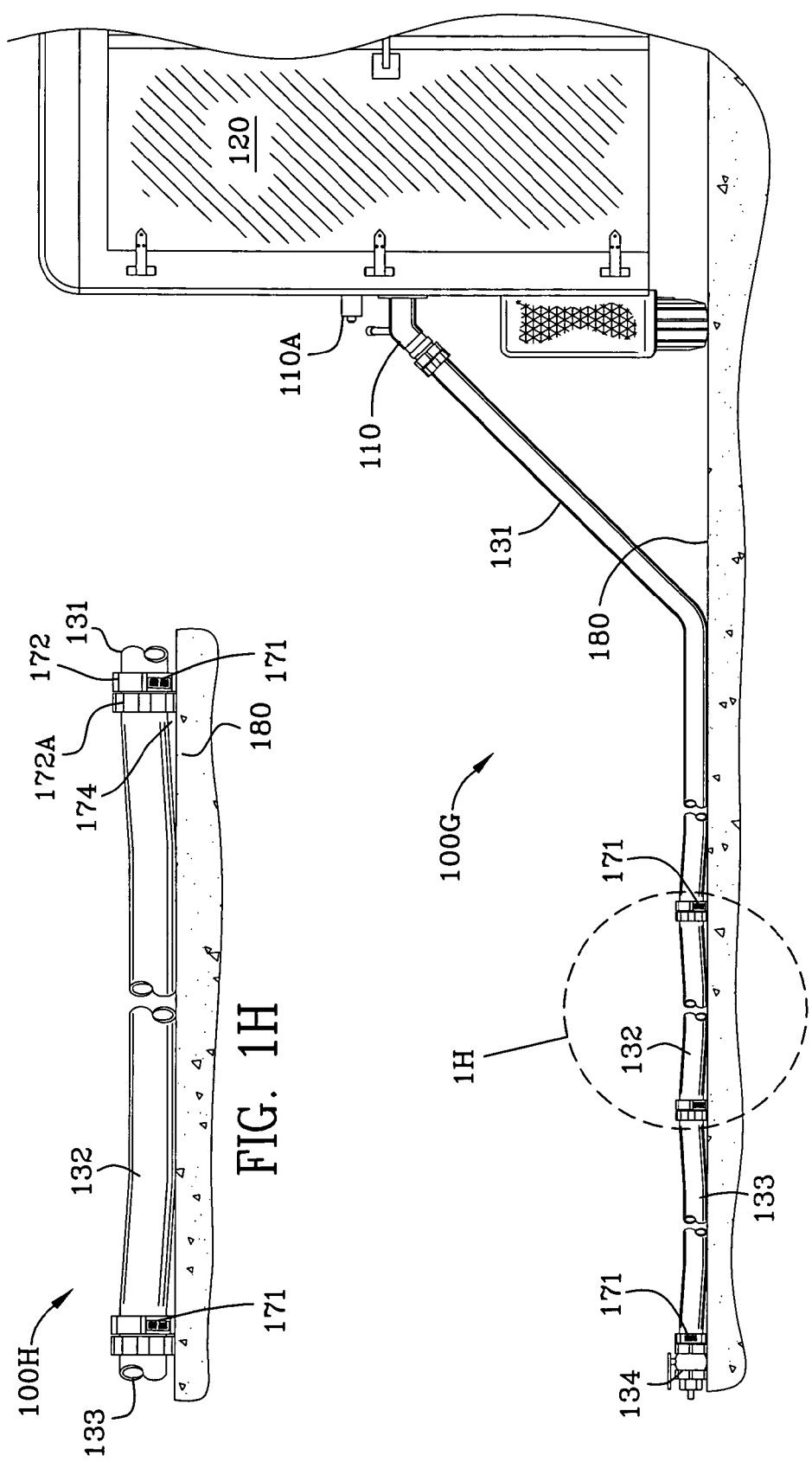

FIRE HOSE TESTING APPARATUS AND METHOD

FIELD OF THE INVENTION

The invention is in the field of fire hose testing apparatuses and methods.

BACKGROUND OF THE INVENTION

The National Fire Protection Association (NFPA) promulgated NFPA 1962 entitled Standard for the Inspection, Care, and Use of Fire Hose, Couplings and Nozzles and the Service Testing of Fire Hose sets forth testing requirements for fire hose and couplings as the title of the document implies. It is necessary that fire departments employ fire hoses which are reliable and suitable for immediate use. Periodic testing of fire hose is necessary and a system for documenting historical testing of the fire hose is desirable.

U.S. Pat. No. 4,599,890 to Girone et al. discloses in the abstract thereof: "a hydrostatic test apparatus for pressure testing fire hoses, pressure vessels such as fire extinguishers, or the like, including a small, portable unit having an inlet line for connection to a hose from an ordinary water tap." "A pump, a first bypass line between the inlet lines for filling the item being tested, a control valve in the first bypass line which is closed during testing to prevent backflow of test pressure into the water supply, a pressure gauge in the outlet line for reading test pressure, and an adjustable relief valve in a second bypass line between the inlet and outlet lines for setting a predetermined test pressure" are also disclosed. "Air vents or bleeds allow the apparatus to be completely bled of air before testing to assure accuracy of the test pressure readings. The apparatus operates on very low water volume for safety". In col. 5, lns. 27 et seq. of U.S. Pat. No. 4,599,890 it is stated that "several lines could be tested simultaneously simply by mounting a manifold (not shown) on threaded outlet 32 and then connecting 300 foot sections of hose to be tested to the outlet ports of the manifold." No indication is given in U.S. Pat. No. 4,599,890 to Girone et al. about testing hoses at different pressures. Nor is there any structure allowing specific lines to be isolated or shut down if a hose leak or burst should occur.

It is desirable, therefore, to efficiently, accurately and cost-effectively test fire hose at low pressure and at the higher service test pressure and to record and maintain the results of the tests.

SUMMARY OF THE INVENTION

A fire hose testing apparatus for testing a plurality of fire hoses is disclosed wherein each of the hoses is required to maintain a specified pressure for a specified duration of time. Fire hoses may be linked together if they have the same service pressure. There are two tests performed on the fire hose. First, there is a low pressure test where the fire hose is pressurized to 45 psig+/−5 psi and observations are then made about leakage and fitting or coupling slippage. If a leak or coupling slippage is observed, then corrective action must be performed. Second, there is a service pressure test where the fire hose is pressurized to a pressure of at least its service test pressure for a three minute period of time.

The term "specified pressure" referred to herein is 5% greater than the service test pressure. Those skilled in the art will recognize that other specified pressures may be used. For instance, the specified pressure may be 2%, 8%, or 10% greater than the service test pressure. In the service pressure test, pressure in the hose is raised to at least 5% more than the service test pressure and then the hose is allowed to stabilize. The term "service test pressure" means the pressure at which a fire hose must be tested to remain in service. The term "test pressure" means a pressure proportional to the "service test pressure" and it is a percentage of the service test pressure. Preferably, the "test pressure" is 90% of the service test pressure. Other test pressures expressed as a percentage of the service test pressure may be used. In the service pressure test, the "actual line pressure" as measured in the branch test conduit must be greater than the "test pressure" for a period of time.

Stabilization allows the hose to expand. Fire hoses are known to expand due to variations in temperature, construction type of hose, age of the hose and pressure applied. Additionally, since the hoses may be linked together provided they do not extend past three hundred feet in length, any one of the individual hose lengths or the coupling may leak.

In the low pressure test, the hose fittings are first marked with a bar code or other identifying indicia. The hoses are checked for leaks at 45 psig+/−5 psi. The hoses are coupled to a respective hose fitting of a respective branch test conduit. Each of the branch test conduits includes an isolation valve, a pressure transducer downstream of the isolation valve, and a hose fitting downstream of the isolation valve. Pressure testing is performed on the hoses with the isolation valves open during the low pressure test and closed during the service pressure test once the specified pressure is achieved.

The branch test conduit and hose fittings are preferably made of metal which can be stainless or some other grade of steel. The isolation valve is preferably a ball valve with a pneumatic operator, for example, air is required to open the valve and a spring closes the valve. The valve does not modulate, it is either fully open or fully closed. Water is supplied to a pressure reducing valve to regulate pressure at 45 psig+/−5 psi. The pressure reducing valve communicates with a water header conduit which supplies water to and pressurizes the plurality of branch test conduits. The branch test conduits are interconnected with the water header conduit and the hoses receive water from the branch test conduits and the water header conduit.

During the low pressure test, pressure in each of the branch test conduits and the hoses is measured and the isolation valve of each of the branch test conduits is open. If and when the pressure transducer measures a sufficient pressure loss with respect to time in any of the branch test conduits and hoses during pressurization and/or when a leak is visually observed in the hose and/or a coupling of the hose, the isolation valve (manifold valve) is closed.

The invention uses a variable frequency-variable speed drive to control the pump motor to drive a positive displacement pump which supplies water to and pressurizes the water header conduit.

A pressure reducing valve is arranged in series with the positive displacement pump if the pump is running. If the pump is not running, the pressure reducing valve supplies water to a pump bypass conduit. The apparatus may reside in a vehicle trailer enabling the trailer to service fire stations regionally on an annual or semi-annual testing schedule. In the service pressure test a plurality of fire hoses are simultaneously tested at different pressures and sizes resulting in cost, time and accuracy advantages.

In the performance of testing to meet regulatory standards of the NFPA, a Service Test Pressure Glossary is helpful. "Service Test Pressure" is the pressure at which the hose is tested. A set point (specified pressure) is an actuating criterion used herein and by definition herein is calculated to be 1.05 times the "service test pressure". The "actual line pressure" (ALP) is the pressure measured in the hose line as inferred by a pressure transducer in the branch test conduit leading to the hose. The "test pressure" is a proportion (i.e. a percentage less than 100 percent) of the "service test pressure". A partial glossary of terms is summarized as follows.

Service test pressure=nominal pressure at which a hose is tested, the value which is inserted by the operator into the controller which is then scaled to a higher value known as the set point (specified pressure).

Test pressure=90% of service test pressure, the actual pressure must be greater than or equal to the test pressure to pass the test. Alternatively, an acceptable predetermined limit below the service test pressure other than 90% may be used.

Specified pressure=set point=service test pressure times a scaling factor such as 1.05.

Actual line pressure (ALP)=pressure measured in the branch test conduits.

A controller (an Allen Bradley programmable logic controller) regulates the variable frequency-variable speed drive which controls the pump motor and limits the rate of pressure rise or fall in each of the branch test conduits. The controller positions the isolation valve of each of the branch conduits depending on the state of the process. For instance, the controller closes the isolation valve as necessary to repair the hose when the low pressure service test is performed at 45 psig+/−5 psi.

Prior to any water entering the hose, while the isolation valve is open, the hose is coupled to the fitting outside the trailer. When the hose is filled with water at low pressure (45 psig+/−5 psig) and is observed by test personnel for leaks, bulges (bubbles) and for rotation of the hose material with respect to its fittings/couplings. Before the low pressure test is commenced the hose is marked where it meets the hose fitting with a magic marker, bar code, or some other type of chalk or with paint. After the hose has been pressurized at low pressure (45 psig+/−5 psi) according to NFPA 1962 (the National Fire Protection Association standard 1962) the hose and fittings are observed for leaks, and bulges (bubbles). If a leak is observed, then the isolation valve for the branch test conduit is closed and the pressure is relieved from the hose and the hose and/or the fitting is repaired or removed.

Operation of the isolation valve is performed by a test operator inside the trailer at the Panel View controller interface. The Panel View interface is a touch screen interface to and with an Allen Bradley programmable logic controller. The 45 psig+/−5 psi low pressure test is controlled by an in-line pressure reducing valve which regulates incoming water pressure to 45 psig+/−5 psi. Usually, water from a fire hydrant (fire plug) is used to supply the test apparatus and is regulated to 45 psig+/−5 psi where it is then fed into a water header conduit for distribution into branch test conduits. The branch test conduits each include an in-line isolation valve, a pressure transducer downstream of the isolation valve and a pressure transducer downstream of the pressure isolation valve. Usually, the preferred isolation valve is a ball valve with an air to open, spring to close actuator controlled by the controller. A solenoid controlled actuator is controlled by the controller. Different valve types may be used and different operators may be used. The spring to close operator has been found to provide rapid closure time so as to prevent the hose coupled to the branch conduit test fitting from whipping and causing damage to nearby equipment and personnel. Each of the branch test conduits terminates in a fitting to which the hose is coupled.

The controller compares the specified pressure (set point) of each of the hoses to the actual line pressure in each of the hoses as measured by the pressure sensor of each of the branch test conduits generating an error signal. The controller generates an output signal (pump speed command) which is based on a proportional plus integral plus derivative algorithm or based on some other algorithm. The proportional plus integral plus derivative algorithm is the sum of: a first proportional constant times the error signal plus a second proportional constant times the integral of the error signal plus a third proportional constant times the derivative of the error signal. The rate of change of the pump speed command is limited by the controller such that the pressure output of the pump and hence the actual line pressure of each hoses being tested does not exceed 15 psi/second. In effect the derivative of the actual line pressure (ALP) is less than or equal to 15 psi/second, $dALP(t)/dt \leq 15$ psi/second.

A method for testing a plurality of fire hoses is disclosed and each of the hoses is required to maintain a test pressure for a specified duration. The steps of the process include coupling each of the hoses to a respective hose fitting of a respective branch test conduit. As previously indicated each of the branch test conduits includes an isolation valve, a pressure transducer downstream of the isolation valve, and a hose fitting downstream of the isolation valve. First, a variable frequency-variable speed drive controls the positive displacement water pump and supplies water to and pressurizes a water header conduit. The plurality of branch test conduits are interconnected with the water header conduit, the hoses receiving water from the branch test conduit and the water header conduit. Actual line pressure sensed from each of the pressure transducers downstream of the respective isolation valve of each of the branch test conduits is inputted into a controller. Specified pressures (set points, 1.05 times the service test pressures) are inputted into the controller for each of the hoses to be tested prior to pressurization for the low pressure test. The procedure for inputting the specified pressures into the controller is to use the touch screen interface whereby the service test pressure is input for each hose line to be tested. The controller includes a scaling factor of 1.05 times the service test pressure which is denoted herein as the set point or the specified pressure. The operator at the touch screen interface will input the service test pressure into the controller. The actual line pressures are then subtracted from the respective specified pressures (set points, 1.05 times the service test pressure) generating pressure error signals. Using the controller, an algorithm is then applied to the individual error signals and a respective pump speed command beginning with the branch test conduit having the lowest specified pressure (1.05 times service test pressure) is generated and outputted. The algorithm is preferably a proportional plus integral plus derivative algorithm, for example, the pump speed command is in the form of: motor speed/pump pressure inferred=$K\Delta P(t)+K_1\int \Delta P(t)+K_2 d/dt\ \Delta P(t)$ with appropriate scaling factors and integration constants (biases). The rate of change of the pump speed and hence, the rate of change of the actual line pressure is then limited by the controller. The respective isolation valve of the branch test conduit for the lowest specified pressure (1.05 times service test pressure) is closed when the branch test conduit pressure and the hose pressure (actual line pressure) is greater than the specified pressure. In this way the pressure in the branch test conduit and hence in the hose under test is elevated by a certain amount typically 5% greater than the service test pressure which the hose must meet to satisfy regulatory and safety standards. Simply put, the specified pressure or set point pressure is equal to 1.05 times the service test pressure.

After the first branch test conduit and hose has reached the specified pressure (i.e., the set point) for testing, the controller then outputs a respective pump speed command for the branch test conduit having the next lowest specified pressure. The controller does this by applying the exact same algorithm and process steps used to generate sufficient actual line pressure for the first line (i.e., the line having the lowest set point pressure). The controller is processing the algorithm for the second hose line in parallel with the algorithm for the first hose line. In identical fashion the controller is applying the same algorithm and the same process steps in parallel for the remaining 3-10 hose lines or more generally stated for 1-n hose lines. The rate of change of the pump speed and hence the rate of change of the pressure in the water header conduit and the branch test conduit is controlled according to industry and safety standards. Specifically, the allowable rate of change of pressure is 15 psi per second so that an increase of pressure, for example, of 60 psi is achieved in 4 seconds. Once the respective branch test conduit and the hose have achieved an actual line pressure greater than or equal to the specified pressure (set point), the respective isolation valve of the branch test conduit is closed. Next, the stabilization period begins on a line by line basis.

The steps of: outputting a respective pump speed command with respect to the branch test conduit having a specified pressure, limiting the rate of change of the pump speed, closing the respective isolation valve of the branch test conduit for the specified pressure (1.05 times service test pressure) when the actual line pressure is greater than or equal to the specified pressure (set point) are performed repeatedly and successively for each branch test conduit from the lowest specified pressure (1.05 times service test pressure) to the highest specified pressure. In other words, the process can be thought of as a seamless step-wise service test. Specifically, for example, if 10 hoses are being tested and each hose tested has a different service test pressure, for example, 100 psig, 125 psig, 150 psig, 175, psig, 200 psig, 225, psig, 250 psig, 275 psig, 300 psig, and 325 psig, the test apparatus and process will first satisfy the 100 psig conduit test branch by raising the pressure from a starting point near 45 psig (when the pump is first activated) at a controlled rate to 105 psig (1.05 times the service test pressure of 100 psig). At this time the isolation valves for all the test branches are open. When 105 psig (5% greater than the specified pressure, i.e., 1.05 times the service test pressure) is reached the isolation valve in the branch test conduit will close while the isolation valves for the other branch test conduits remain open communicating fluid to the other hoses being tested. Next, the controller seamlessly (and simultaneously) in parallel commands a speed output to the motor to increase the speed to obtain the required specified pressure (set point) for the next hose to be tested, namely, approximately 131.25 psig 1.05 times service test pressure of 125 psig). The process is repeated until the specified pressures (set points) are satisfied in all of the hose lines.

Due to expansion of the hoses under pressure the volume of the hoses will increase and the pressure will be reduced. If the reduction in actual line pressure goes below the service test pressure of the hose then the actual line pressure must be increased (i.e. boosted) to the specified pressure (i.e. set point pressure, 1.05 times the service test pressure. Temperature, pressure, type of fire hose and age of the fire hose are all factors which determine its expansion. Once the specified pressure (1.05 times service test pressure) at which the fire hose is to be tested is achieved, the hose under test is stabilized for a period of up to three minutes depending on the hose length under test. During the stabilization period, the pressure may decrease as just described. If the actual line pressure goes below the service test pressure then the pressure must be increased or boosted. The step of opening the respective isolation valves and boosting the actual line pressures, if necessary, of one or more of the respective branch test conduits and the hoses coupled thereto is performed if the actual line pressure is less than or equal to the service test pressure. One boost cycle is preferred; however, additional boost cycles can be added to the process if desired. If the hose does not maintain its pressure above the service test pressure after being once boosted, then the fire hose is taken out of service.

Boosting the pressure is accomplished by starting the pump motor and following the process steps stated above. Once the specified pressure (1.05 times service test pressure) for a given hose is again achieved, the respective isolation valve of that branch test conduit is closed. If, for example, the set points of the first seven lines have been achieved and the controller is in the process of bring the eighth line up to its set point pressure (specified pressure) and at this time the third hose line under test falls below its service test pressure, the controller finishes pressurizing the $8^{th}$, $9^{th}$ and $10^{th}$ lines to their set points before boosting the pressure in the $3^{rd}$ line to its set point.

During pressurization by the pump for the service pressure test or during pressurization using a fire hydrant as the source of the water for the low pressure test, the isolation valves of the branch test conduit immediately close when the respective pressure transducers sense a sufficiently reduced pressure with respect to time. In other words should a hose burst during a test or develop a significant leak, the pressure of that hose and the pressure in the branch test conduit will be reduced dramatically and will exceed a preset limit. Thus an indication of a leak or a hose failure can be determined by the controller as it monitors the actual line pressure in each branch test conduit and hose as a function of time. When the slope of the actual line pressure as a function of time is less than or equal to some permissibly negative rate then a leak or burst of the hose may be assumed and the isolation valve for the effected hose under test must be quickly closed. This is accomplished by the controller determining the derivative (slope) of the actual line pressure with respect to time and comparing that value to a preset value, for example, $-J$. The preset value of $-J$ is determined so as to accommodate expansion of the hose during the stabilization process where some decrease in pressure with respect to time is permissible.

The test method, said another way, includes stabilizing each of the branch test conduits and the hoses coupled thereto if the actual line pressure in each hose is greater than or equal to the specified pressure. If the hose loses too much actual line pressure and falls below the service test pressure, then, the pressure is boosted above the specified pressure and the hose line proceeds into the test period. If the actual line pressure is greater than or equal to the test pressure (preferably 90% of service test pressure) for a specified duration (usually at least 3 minutes for 300 feet of hose), then the hose passes the test and the controller displays the result on the graphical user interface. The stabilization and test periods are one minute per 100 feet of hose. Therefore if the hose lengths are shorter then the stabilization periods are shorter. If the actual line pressure is not greater than or equal to the test pressure then the hose fails the test and the controller displays the results on the graphical user interface.

Before the testing of the hose begins and during the setup of the test each hose is identified using a bar code system. Other identifying indicia may be used as well. The bar code and/or other identifying indicia may be used to track the performance of the hose from one annual test to another thus developing historical data in regard to the hose. The bar code is applied to the hose coupling/fitting. This data may be stored in the controller or it may be stored in a portable device interconnectable with the controller. Pass fail data and other test data may be recorded and stored in a spreadsheet and the spreadsheet may be uploaded to a website accessible by fire departments in the region serviced by a given mobile fire hose testing trailer.

BRIEF DESCRIPTION OF THE DRAWINGS

FIG. 1C is an enlargement of a portion of a hose in its depressurized state illustrating the coupling and an end portion of one of the hoses with an identifying bar code placed on the coupling.

FIG. 1D is an enlargement of a portion of a hose in its pressurized state illustrating the coupling and an end portion of one of the hoses with an identifying bar code placed on the coupling.

FIG. 1E is a cross-sectional view taken along the lines 1E-1E of FIG. 1B illustrating a weighted clamp to tie the hose to the surface.

FIG. 1G is a side view of smaller diameter hoses laid out in the pressurized state.

FIG. 1H is an enlarged portion of FIG. 1F illustrating a section of hose.

A better understanding of the drawings will be had when reference is made to the description of the invention and the claims which follow.

DESCRIPTION OF THE INVENTION

A fire hose testing apparatus for testing a plurality of fire hoses is disclosed wherein each of the hoses is required to maintain a specified pressure (1.05 times service test pressure) for a specified duration of time. The terms "specified pressure" and "set point" mean a pressure 1.05 times the service test pressure. The "actual line pressure" is the measured pressure in the hose.

There are two tests performed on the fire hose. The fire hoses may be linked together as illustrated in FIGS. 1B and 1F if they have the same service test pressure.

First, there is a low pressure test where the fire hose is pressurized to 45 psig+/−5 psi and observations are then made about leakage. If a leak is observed, then corrective action must be performed.

Second, there is a service pressure test where the fire hose is pressurized to a pressure greater than its service test pressure for a period of time of at least three minutes (for three hundred feet of hose). The set point pressure is sometimes referred to herein as the specified pressure (1.05 times service test pressure) and this pressure is typically 5% greater than the service test pressure of the hose. The service test pressure is inputted to the controller by a test operator using the touch screen interface to the controller. In the service pressure test the hose is raised to the set point pressure of 1.05 times the service test pressure and then the hose is allowed to stabilize.

Stabilization allows the hose to expand. Fire hoses are known to expand due to variations in ambient temperature, water temperature, construction type of the hose, age of the hose, and pressure applied. Additionally, since a plurality of hoses may be linked together provided they do not extend past three hundred feet in total length, any one of the individual hose lengths, fittings or couplings may leak. During stabilization the actual pressure in the hose is permissibly reduced below the set point pressure (specified pressure) due to expansion of the hose provided the actual line pressure does not fall below the service test pressure of the hose. If actual line pressure falls below the service test pressure during stabilization one boost cycle is performed. It then enters the service pressure test where the pressure is allowed to fall below the service test pressure and still meet the test criterion, passing the service pressure test if the actual line pressure is at least 90% of the service test pressure after sufficient time lapse. If the actual line pressure is not at least 90% of the service test pressure after a sufficient time lapse then the hose fails the service pressure test.

Figures 1, 1A:
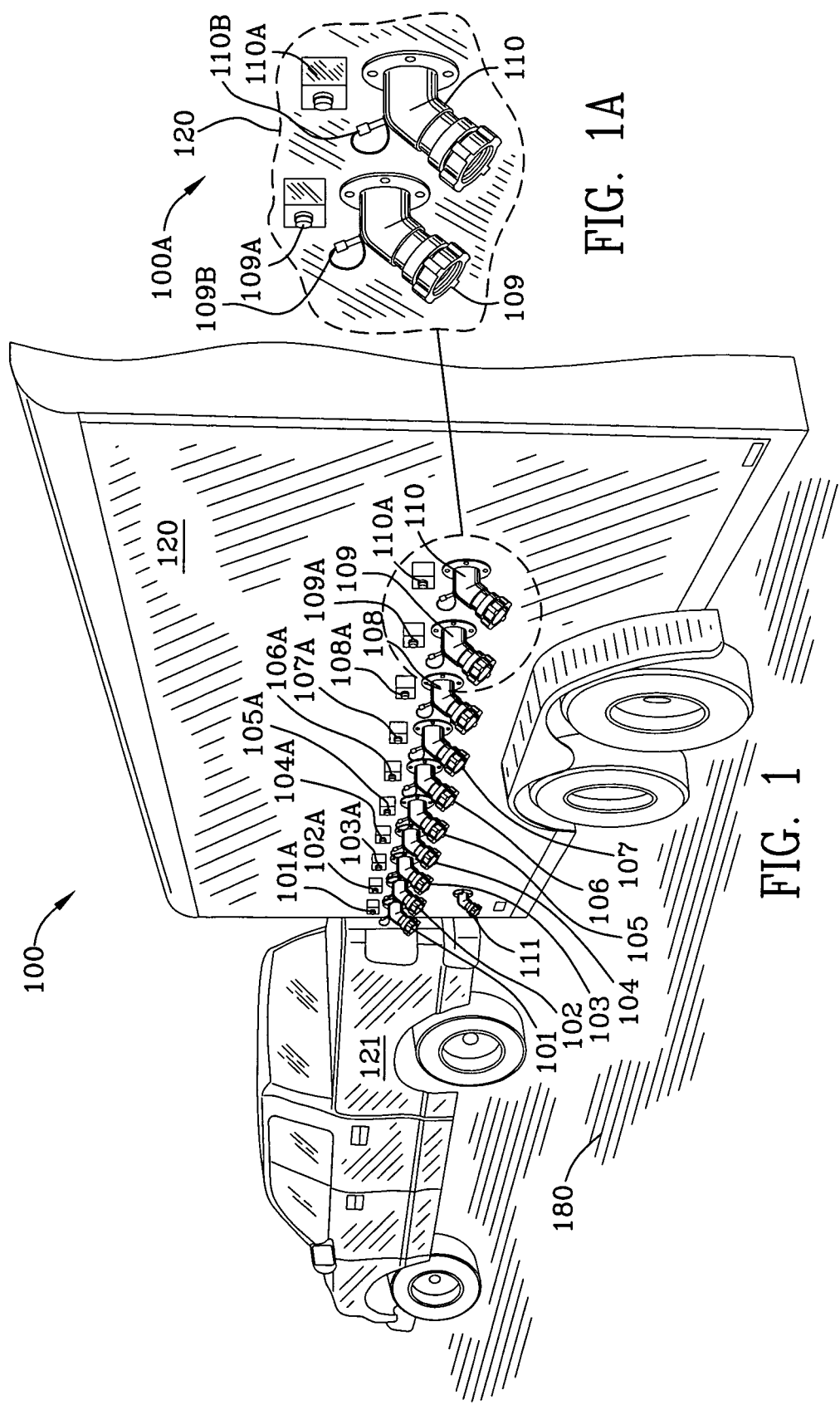
FIG. 1 is a perspective view of a vehicle trailer wherein hose fittings and elbows protrude from a side of the trailer.
FIG. 1A is an enlarged portion of two of the hose fittings and elbows protruding from the side of the trailer along with the strobe annunciators.
Figure 1B:
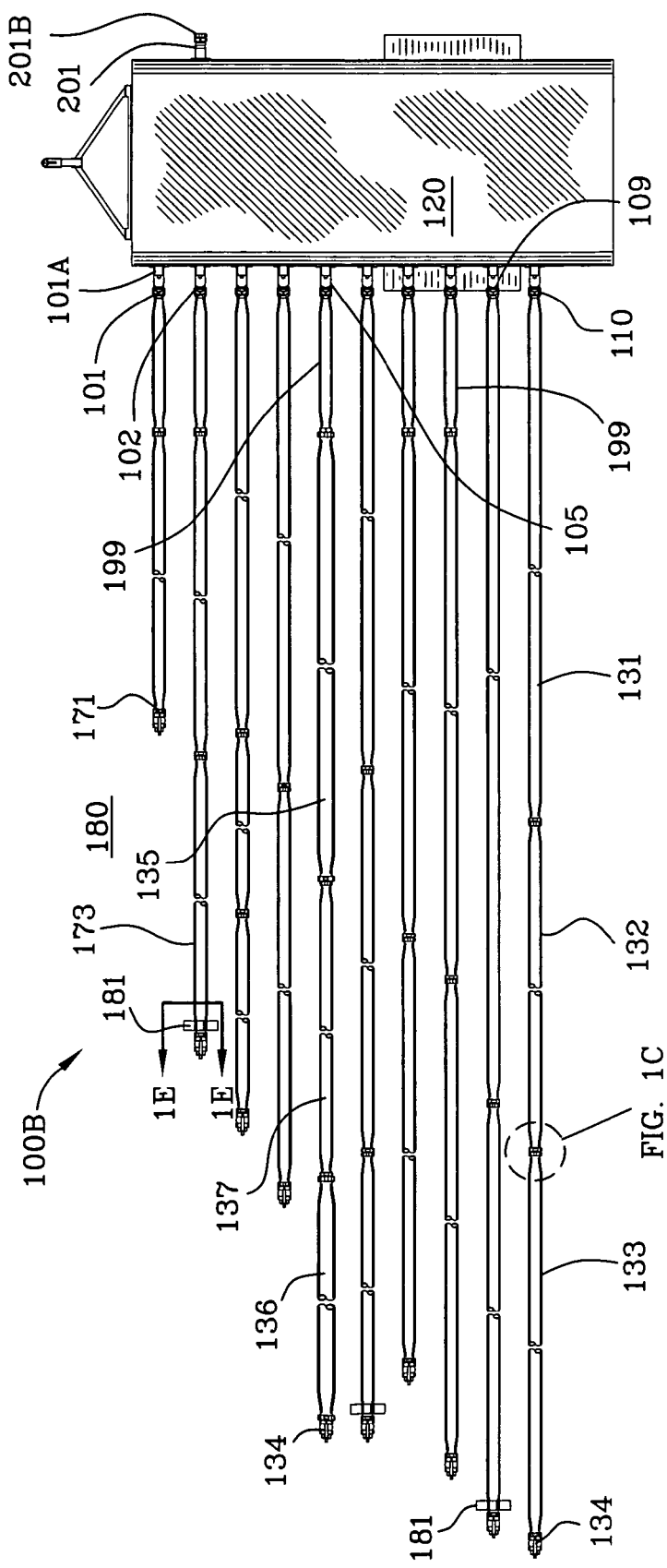
FIG. 1B is a schematic of a trailer with the hoses laid out before pressurization thereof.
Figure 1F:
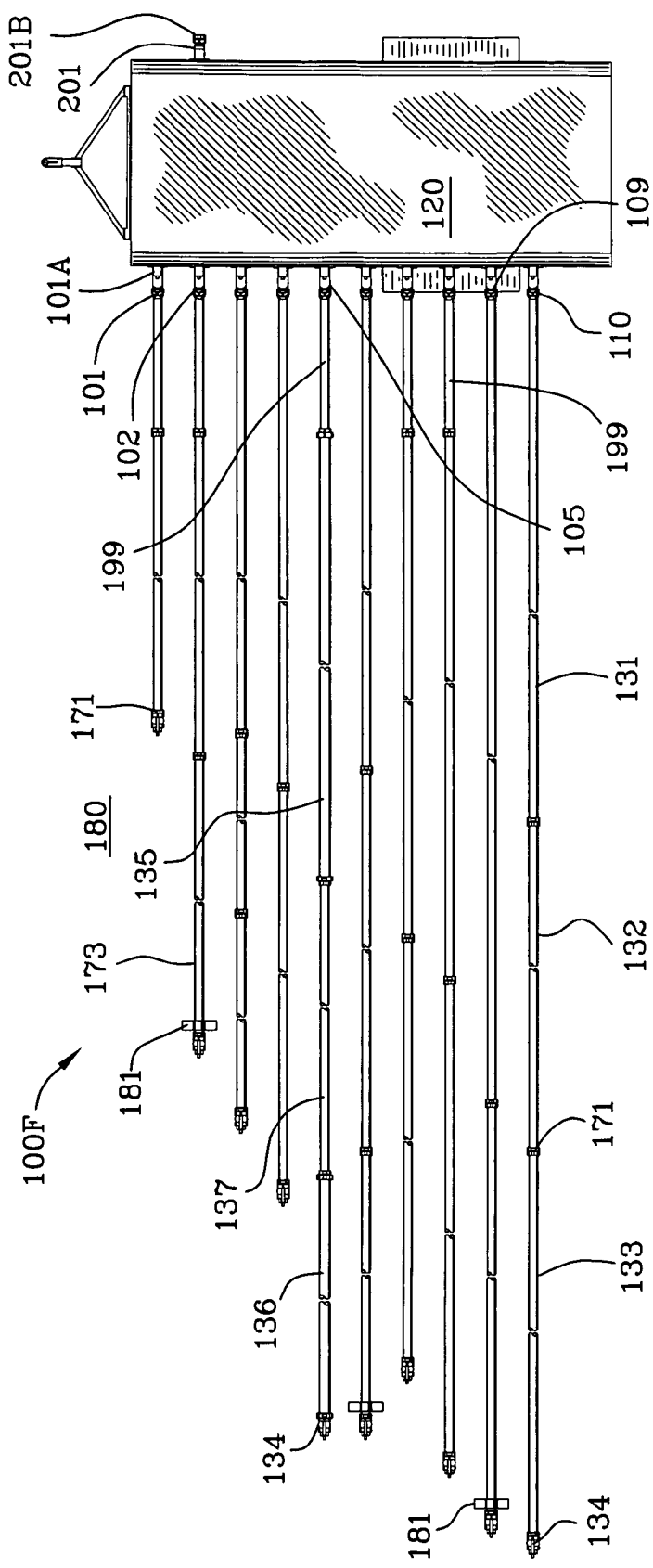
FIG. 1F is a schematic of a trailer with ten hoses laid out after pressurization thereof.

FIG. 1 is a perspective view 100 of a vehicle trailer 120 wherein hose fittings and elbows 101, 102, 103, 104, 105, 106, 107, 108, 109, 110 protrude from a side of the trailer. Truck 121 tows trailer 120 to different testing locations. FIG. 1A is an enlarged portion 100A of two of the hose fittings and elbows 109, 110 protruding from the side of the trailer. FIG. 1A also illustrates strobe annunciators 101A, 102A, 103A, 104A, 105A, 106A, 107A, 108A, 109A and 110A which illuminate when the service pressure test is performed.

Still referring to FIGS. 1 and 1A, hose fittings and elbows are arranged at an angle with respect to the side of the trailer 120 and point downwardly toward the surface 180 of the parking lot or roadway. Surface 180 is used to lay out the hose test and should be clean and flat. FIG. 1 also illustrates the drain fitting and elbow 111.

FIG. 1B is a schematic 100B of a trailer with the hose layout illustrating ten hose lines before pressurization thereof. Specifically, FIG. 1B illustrates hose sections lying flat on surface 180 in the depressurized state. The number of hose lines which may be tested is variable and may range preferably from 1 to 10. More or fewer than 10 lines may be utilized with design changes specifically contemplated within the scope of this disclosure.

Figure 1I:
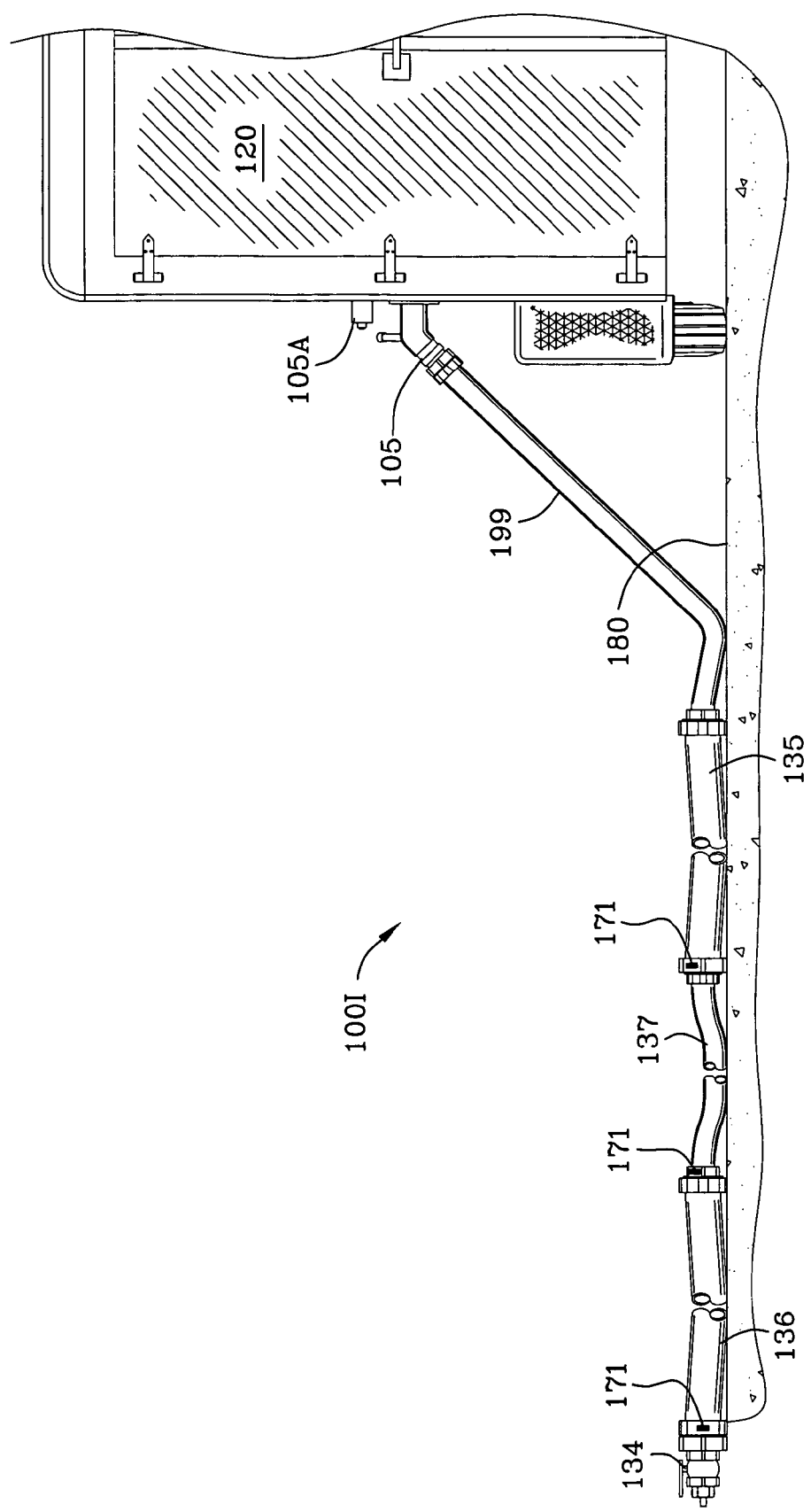
FIG. 1I is a side view of one of the hose lines illustrating an adapter hose and hoses of different diameter interconnected together.

Still referring to FIG. 1B, adapter hoses 199 which lead from the fittings which protrude from the side of the trailer are illustrated. Adapter hoses 199 are used if the diameter of the hose to be tested is greater than or equal to 3.5 inches in diameter. An adapter hose 199 is used to interconnect hoses 135, 137, and 136. It will be noticed that hose 137 is slightly narrower in diameter than hoses 135 and 136. However, if the first hose in line (135, 136, and 137) in the line is at least 3.5 inches in diameter, then an adapter hose must be used. FIG. 1I is a side view 1001 of one of the hose lines illustrating an adapter hose 199 and hoses 135, 136 of different diameter interconnected together.

Hoses smaller than 3.5 inches in diameter do not require adapter hoses 199 as they are connected directly to the fittings as indicated by the first hose line 131, 132, 133. The hoses may be interconnected through couplings or joints 172, 172A with hoses having different diameters but having the same service test pressure. See FIG. 1C. The total length of interconnected hose shall not exceed 300 feet.

Figure 2:
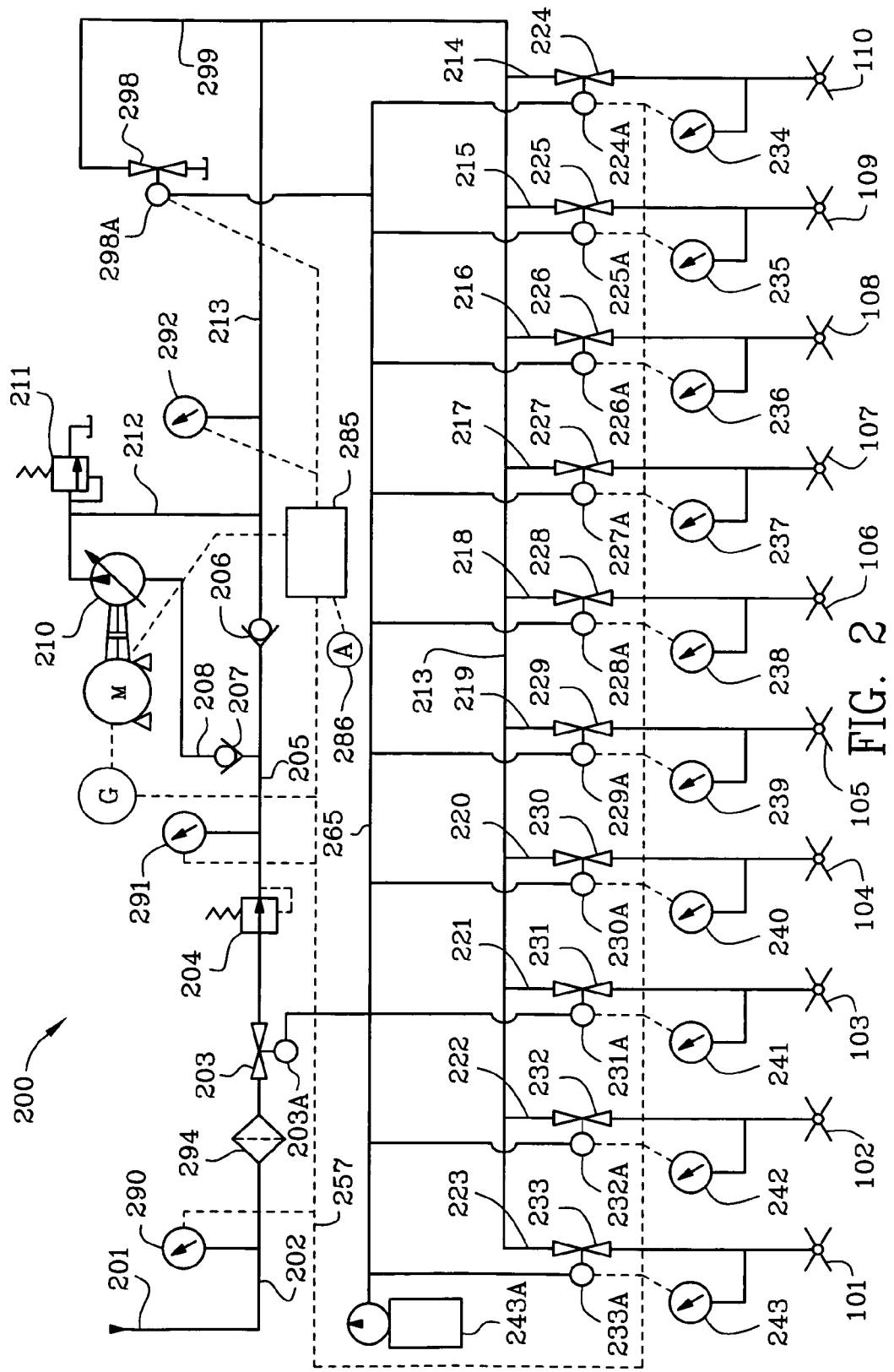
FIG. 2 is a schematic of the process and instrument diagram illustrating the valving arrangement, pressure reducing valve, pressure sensors (transducers), controller and pump.

Still referring to FIG. 1B, the first hose lines indicates three hoses 131, 132, and 133 joined together. An end cap fitting 134 best viewed in FIGS. 1G and 1I enables bleeding of air from the end of the hose. Preferably, air is bled from the hose after it has been initially filled. Water from a fire hydrant is communicated to an inlet line 201 which in turn communicates with an in-line water filter 294 which in turn communicates with pipe section 202 and then proceeds to pressure reducing valve 204 where the pressure is reduced to 45 psig+/−5 psi. FIG. 2 is a schematic 200 of the process and instrument diagram illustrating the valving arrangement, pressure reducing valve, pressure sensors (transducers), controller and pump.

Referring to FIG. 2, the water is then communicated to pipe section 205 and then to water header conduit 213. Water header conduit 213 communicates with and out to branch test conduits 214, 215, 216, 217, 218, 219, 220, 221, 222, 223 through the isolation valves 224, 225, 226, 227, 228, 229, 230, 231, 232, 233 and then to the respective fire hoses. The branch test conduits are interconnected with the water header conduit 213 using pipe unions known as pipe tees. As water flows into and through each of the respective fire hoses, a valve included in fitting 134 at the end of the last hose in the hose line is closed. Once filled, the hose is elevated to a height at least as high as the fitting and elbows 101-110 on the trailer and the valve 134 is opened to bleed the air off. The fittings and elbows 101-110 on the trailer are located a convenient height above the test surface (parking lot, unused roadway, etc.) so that test personnel may easily interconnect the hose fitting to the fitting on the end of the branch test conduit. Additionally, the test fittings and elbows 101-110 include air bleed ports such as those bleed ports 109B, 110B illustrated in FIG. 1A. Caps on the bleed ports may be temporarily removed to ensure that air is removed from the hose. Once air from the hose is completely eliminated the valve in the end cap fitting 134 is closed.

Still referring to FIG. 1B, the hoses 131, 132, 133 have a diameter less than 3.5 inches. Once the hoses have been filled with water and any entrapped air is removed therefrom, the hoses are then secured by weighted clamps 181 as illustrated in FIGS. 1B and 1E. Hose 173 is illustrated within the weighted clamp 181 in FIG. 1E. FIG. 1E is a cross-sectional view 100E taken along the lines 1E-E of FIG. 1B. Weighted clamps 181 are not illustrated on each of the lines in FIGS. 1B and 1F for the sake of drawing clarity. However, the weighted clamps or other securement is applied to the ends of all of the hoses to prevent whipping of the hoses upon performance of the service pressure test. For instance, as an alternative, all of the hoses can be interconnected in a single weighted rack.

FIG. 1C is an enlargement 100C of a portion of hoses 132, 133 illustrating the coupling 172, 172A and an end portion of one of the hoses with an identifying bar code 171 placed on the coupling. In proximity to the coupling 172, 172A the hoses being joined are shown as being of somewhat lesser diameter as compared to the portion thereof which lies flat somewhat rightwardly and leftwardly of the coupling. FIG. 1D is an enlargement 100D of a portion of a hose 132 in its pressurized state illustrating the coupling 172, 172A and an end portion of one of the hoses 132 with an identifying bar code 171 placed on the coupling. FIG. 1F is a schematic 100F of the trailer 120 substantially similar to FIG. 1B with the hose layout illustrating the ten hose lines after pressurization thereof. The diameters of the hose in FIG. 1F appear more uniform between the fittings as the hose lines are pressurized. Hose fittings may be threaded or they may be of the Storz type.

FIG. 1G is a side view 100G of a smaller diameter hose (less than 3.5 inches in diameter) in the pressurized state. It will be noticed that the diameter of all of the hoses illustrated in FIG. 1G are less than 3.5 inches in diameter and that no adapter hose is required. It will be further noticed that the lengths of the hoses are not the same according to the diagrammatic depiction of FIG. 1C. It will be further noticed that a slight gap 174 exists between hose 132 and the surface 180 of the parking lot as illustrated in FIGS. 1G and 1H. FIG. 1H is an enlarged portion 100H of FIG. 1G.

FIG. 2 is the process and instrument diagram 200 illustrating the valving arrangement, pressure reducing valve 204, pressure sensors (transducers) 234, 235, 236, 237, 238, 239, 240, 241, 242, 243, 290, 291, 292 controller 285 and pump 210. The controller 285 is preferably an Allen Bradley AB Logix programmable logic controller utilizing an Allen Bradley Panel View Plus 1000 2711P-T4C4A1 touch screen interface. Controller 285 is not shown in FIGS. 2A and 2B. Controller 285 controls the service pressure test as set forth below in an automatic mode. In manual mode the operator utilizes the touch screen interface to enter service test pressures to control operation of all of the valves and the variable frequency-variable speed drive to control the motor. An operator may toggle back and forth between automatic and manual modes. The controller 285 dictates the position of the isolation valves 224-233, main valve 203, and drain valve 298. Controller 285 actuates the solenoid controlled pneumatic operators which control the position of the isolation valves 224-233, main valve 203 and drain valve 298. All of the isolation valves (sometimes referred to herein as manifold valves) fail safe in the closed position upon loss of control air from the air compressor 243A or electrical power to the solenoids. The solenoids are part of the operators 224A-233A, 203A and 298A. The operators are sometimes referred to as actuators and are air to open, spring to close actuators. Under loss of electrical power or control air pressure, all of the isolation valves, the main valve and the drain valve fail safe in the closed position. Reference numeral 257 schematically denotes electrical power distribution to and from the identified components. Reference numeral 257 schematically denotes electrical control signal communication between the input/output modules of the controller 285 and the electrical components of the system such as the solenoid valves controlling air to the air operated valves, the pump motor M drive controls and the pressure transducers.

Figure 4:
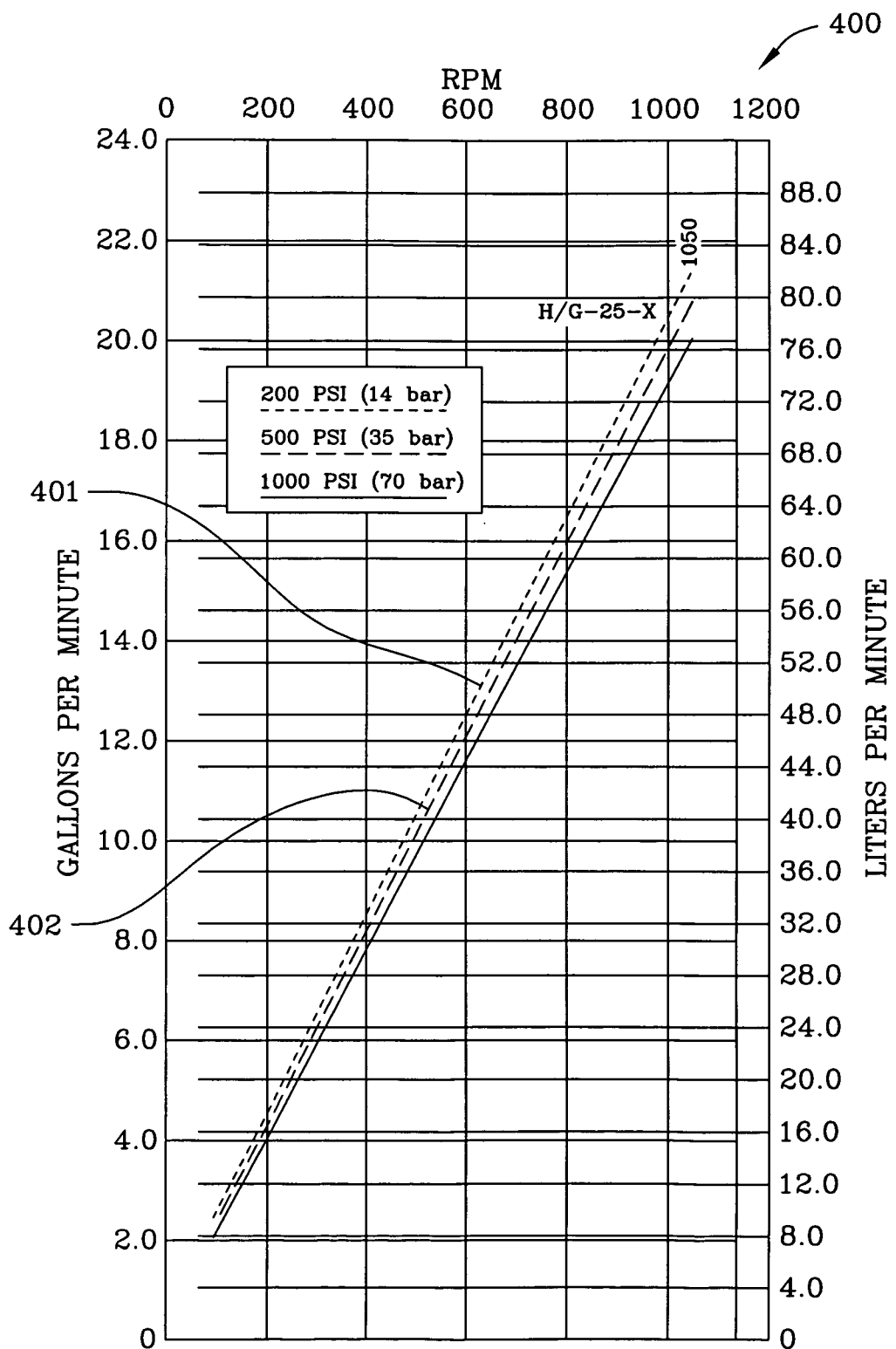
FIG. 4, prior art, illustrates pump curves for various operating pressures.

Pump 210 is a positive displacement pump manufactured by Wanner Engineering, Hydra-Cell Model H-25, capable of generating pressure greater than or equal to 500 psig. FIG. 4, prior art, illustrates 400 pump curves 401, 402 for the Hydra-Cell Model H-25 pump wherein various operating pressures, speeds and flow rates are illustrated. FIG. 4 indicates that if speed is increased for a given flow rate that pump output pressure is controlled. Pump output pressure varies as a function of speed and flow rate. Different pumps with different output curves and operating speeds for constant volumetric output may be used.

The controller is automatically booted once power is available, namely, once the portable generator G mounted on the exterior of the front of the trailer is started. Alternatively, power may be available at the test site from the local utility or municipality. From the touch screen interface 285, the specified pressures (set points) 392 for the service pressure test may be set for each of the hose lines coupled to fittings 101-110 to be tested. The control system program is written using Rockwell RSLogix 5000 software along with Panel View plus touch screen interface software. Communication between devices is made through a custom-made RS Linx software program. The pressure transducers are Honeywell Sensotec FP2000 outputting 4-20 ma dc or 0-10V dc. An Allen Bradley Power Flex 22C-B033N103 variable frequency-variable speed drive controls the motor and runs the Hydra-Cell pump 210. A control algorithm, preferably a proportional plus integral plus derivative algorithm having the general form of $K\Delta P(t)+K_1\int \Delta P(t)+K_2 d/dt\, \Delta P(t)$, 382, outputs a speed command to the variable frequency-variable speed drive to control the motor M. The speed rate of change command, however, is limited by the controller to a rate of change equivalent to 15 psi/sec pump output pressure as sensed by the pressure transducers of each test conduit. The 15 psi/s speed output is included in the fire hose test procedure NFPA 1962, Edition 2003 procedure for testing fire hose.

Figure 2A:
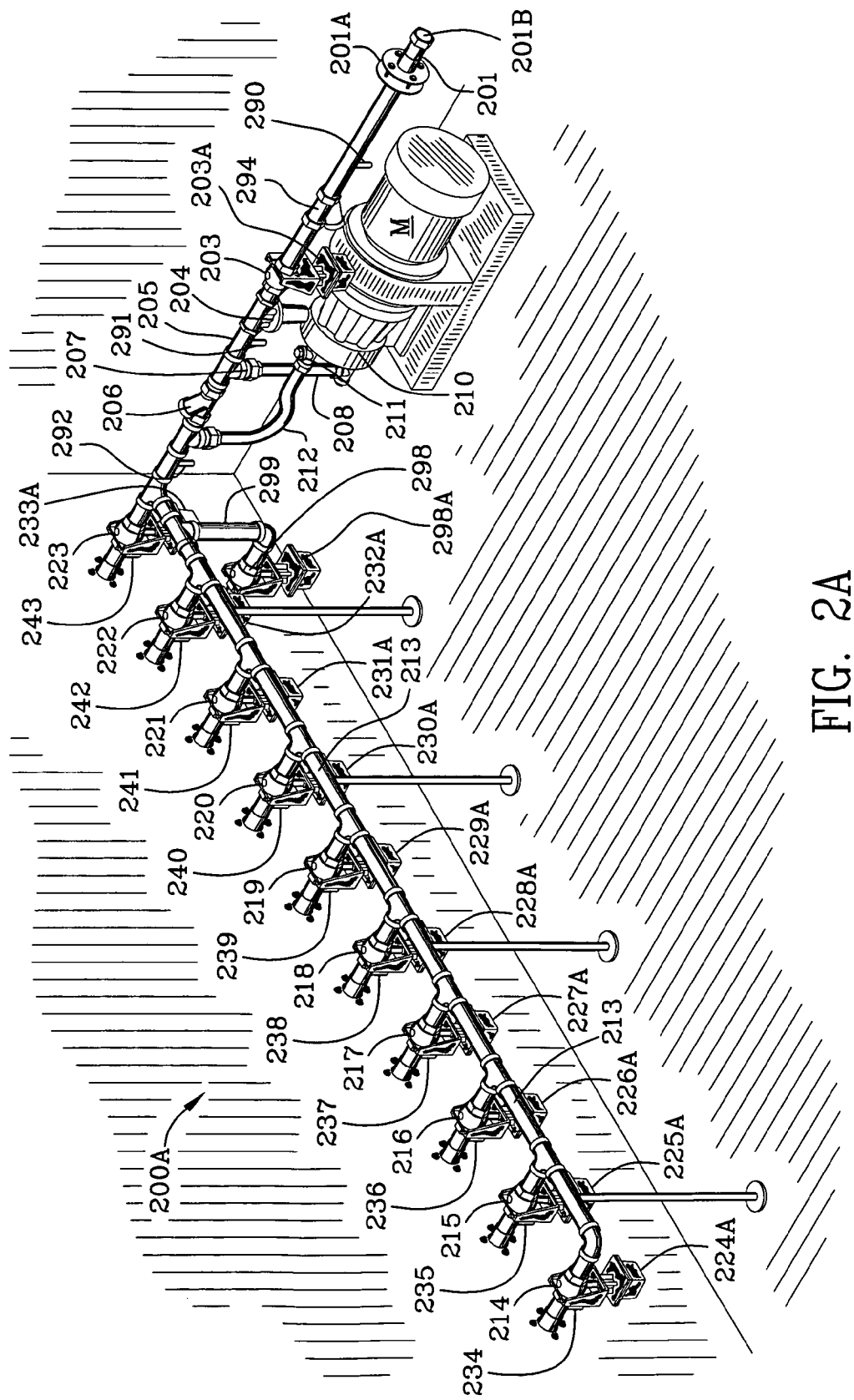
FIG. 2A is a perspective view of the interior of the trailer illustrating the valving arrangement, pressure reducing valve, sensors and pump.
Figure 2B:
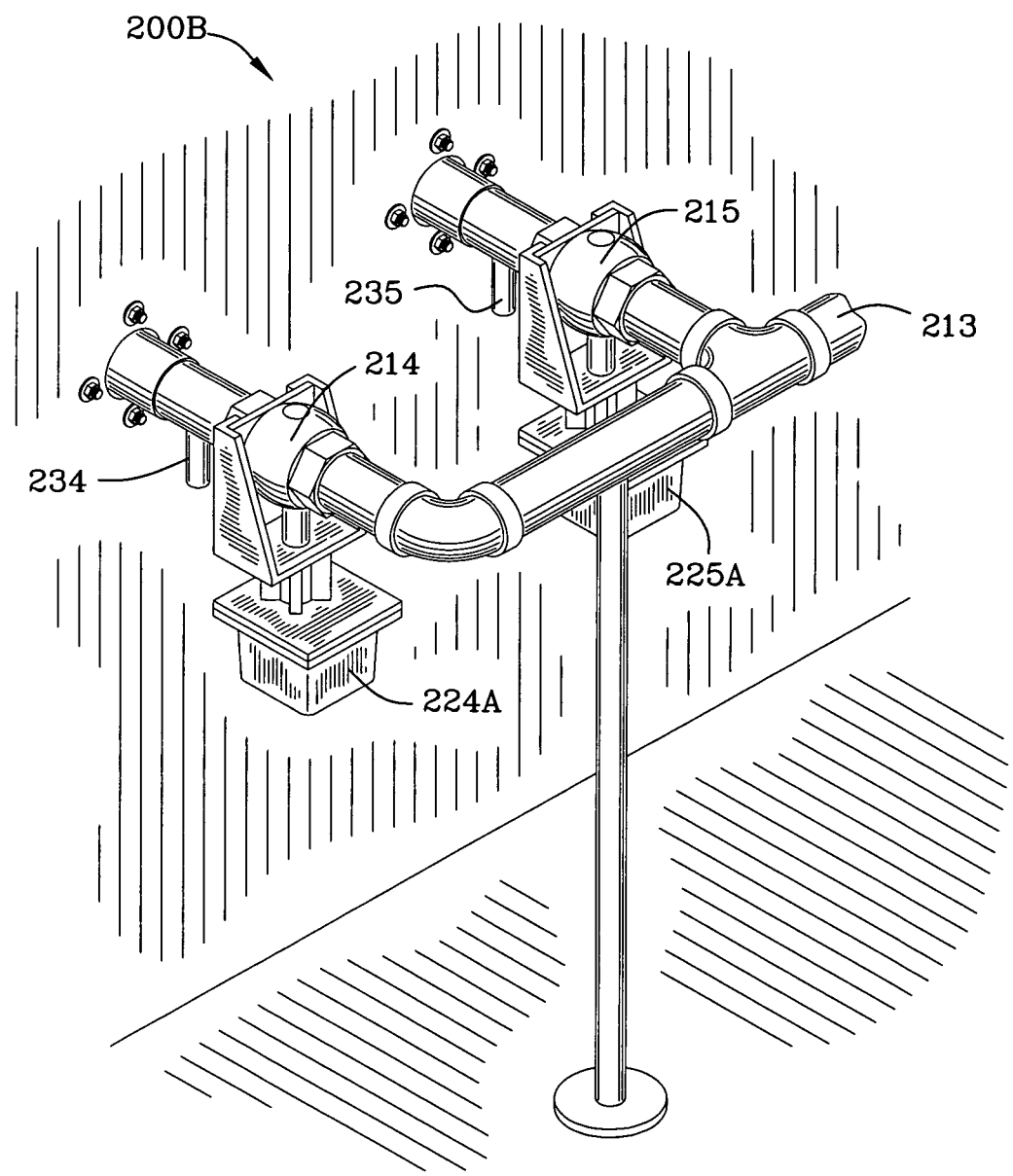
FIG. 2B is an enlargement of a portion of FIG. 2A illustrating two isolation valves (manifold valves) and pressure sensors.

Each of the branch test conduits is nominally 2.5 inches in diameter and include a ball valve having a pneumatic operator, a pressure transducer downstream of the ball valve and elbow and terminal end fitting for interconnection with the fire hose. Most of the metal piping and interconnections used in the test apparatus are 2.5 inches in diameter. FIG. 2A is a perspective view 200A of the interior of the trailer illustrating the valving arrangement, pressure reducing valve, sensors and pump. FIG. 2B is an enlargement 200B of a portion of FIG. 2A illustrating two isolation valves (sometimes referred to herein as manifold valves) 214, 215 and pressure sensors. FIG. 2B also illustrates pressure transducers 234, 235 in the branch test conduits.

Referring to FIGS. 2 and 2A, water inlet line 201 includes an in-line strainer 294 to remove dirt which may be in the fire hydrant piping once the inlet line 201 is interconnected with the fire hydrant (or other source) not shown. Water inlet pressure of approximately 80-150 psig is monitored by the pressure transducer 290 on the inlet water supply and is a permissive to opening main valve 203. In other words, if a sufficient actual line pressure is not sensed upstream of the main valve 203, then the main valve will not open even if commanded to do so. Main valve 203 is an air operated ball valve which requires air pressure applied to the operators/actuators to open and closes under the force of the spring in the operator/actuator. Use of air to open, spring to close valves allows quick closure of the ball valves and this is especially important for the isolation valves for the branch test conduits. The ball valves used have minimal leakage under pressure and employ seats. Plastic seats may also be used. Air compressor 243A is diagrammatically shown in FIG. 2 but does not appear in FIGS. 2A and 2B.

Referring to FIG. 2A, air is distributed through an air header 265 to the pneumatic operators of all of the valves, 224-233, 203 and 298. All of the valves, 224-233, 203 and 298, are preferably Jamesbury ball valves using teflon seats. Water is communicated from the inlet 201, through strainer 294, through main valve 203 and into and through pressure reducing valve 204 where its pressure is reduced to 45 psig+/−5 psi. Forty five psig (45 psig+/−5 psi) was chosen to meet the NFPA standard for the low pressure test. A pressure reducing valve is arranged in series with the positive displacement pump if the pump is running. The pressure reducing valve is arranged in series in a pump bypass conduit. The apparatus may reside in a vehicle trailer enabling the trailer to service fire stations regionally on a yearly or semi-annual testing schedule. Use of the vehicle and the invention residing therein enables the testing of a plurality of fire hoses at one time, at different pressures and sizes resulting in cost, time and accuracy advantages.

Outlet pressure of the pressure reducing valve 204 is monitored and measured by pressure transducer 291 interconnected with the outlet of the pressure reducing valve. A certain liberty has been taken in FIG. 2 using a pressure gauge symbol for the pressure transducers 290, 291, 292 and 234-243. Those skilled in the art will readily recognize that a pressure gauge may be used in conjunction with a pressure transducer. A pressure transducer senses and transmits 257 an electrical signal to a controller 285 and a display device and touch screen interface. A typical pressure gauge is read visually.

Pump 210 is driven by the motor M which is controlled by the variable frequency-variable speed drive. A generator mounted on the exterior of the vehicle trailer 120 provides power to the pump motor and to the compressor. Pump suction line 208 is nominally 1.25 inches in diameter. Pump discharge line 212 is nominally 1 inch in diameter. The pump suction and discharge lines are flexible hose lines. Other water header conduit diameters and piping and flexible hose line specifications may be used depending on the particular application of the test apparatus and methods.

The generator G is mounted on the front of the trailer and resides between the trailer and the vehicle. Check valve 207 prevents reverse flow through the pump when it is not operating during the low pressure test and/or while municipal water is being supplied to the water header conduit 213. Further, when the pump M is running, check valve 206 ensures that the pump will not back feed into the municipal water system and possibly damage the pressure reducing valve. Relief valve 211 is on the outlet of the pump and is typically set at 450 psig. Water header conduit (i.e. pump outlet) pressure is sensed and transmitted by transducer 292. Pneumatically operated 298A drain valve 298 is interconnected by water conduit 299 and serves to relieve pressure in the water header conduit 213 when desired.

Branch test conduits include interconnecting pipes or conduits 214, 215, 216, 217, 218, 219, 220, 221, 222, 223 arranged in parallel with each other and fed by water header conduit 213. Water header conduit 213 is nominally 2.5 inches in diameter as are the branch test conduits. As used herein the branch test conduits include the interconnecting conduits 214, 215, 216, 217, 218, 219, 220, 221, 222, 223 and the respective isolation valves 224, 225, 226, 227, 228, 229, 230, 231, 232, 233 and the respective elbows and fittings 101, 102, 103, 104, 105, 106, 107, 108, 109, 110. Each of the isolation valves includes a respective pneumatic operator (air operator) 224A, 225A, 226A, 227A, 228A, 229A, 230A, 231A, 232A, 233A. Each of the branch test conduits also include a respective pressure transducer 234, 235, 236, 237, 238, 239, 240, 241, 242, 243.

Each of the pressure transducers measures actual line pressure in the branch test conduit and the hose. The isolation valve of each of the branch test conduits is closed when the specified pressure (1.05 times service test pressure) of each of the branch test conduit and the hose is achieved. The isolation valve of each of the branch test conduits closes during pressurization if and when the pressure transducer measures a sufficient actual line pressure loss with respect to time in each of the branch test conduits and hoses.

Figure 3:
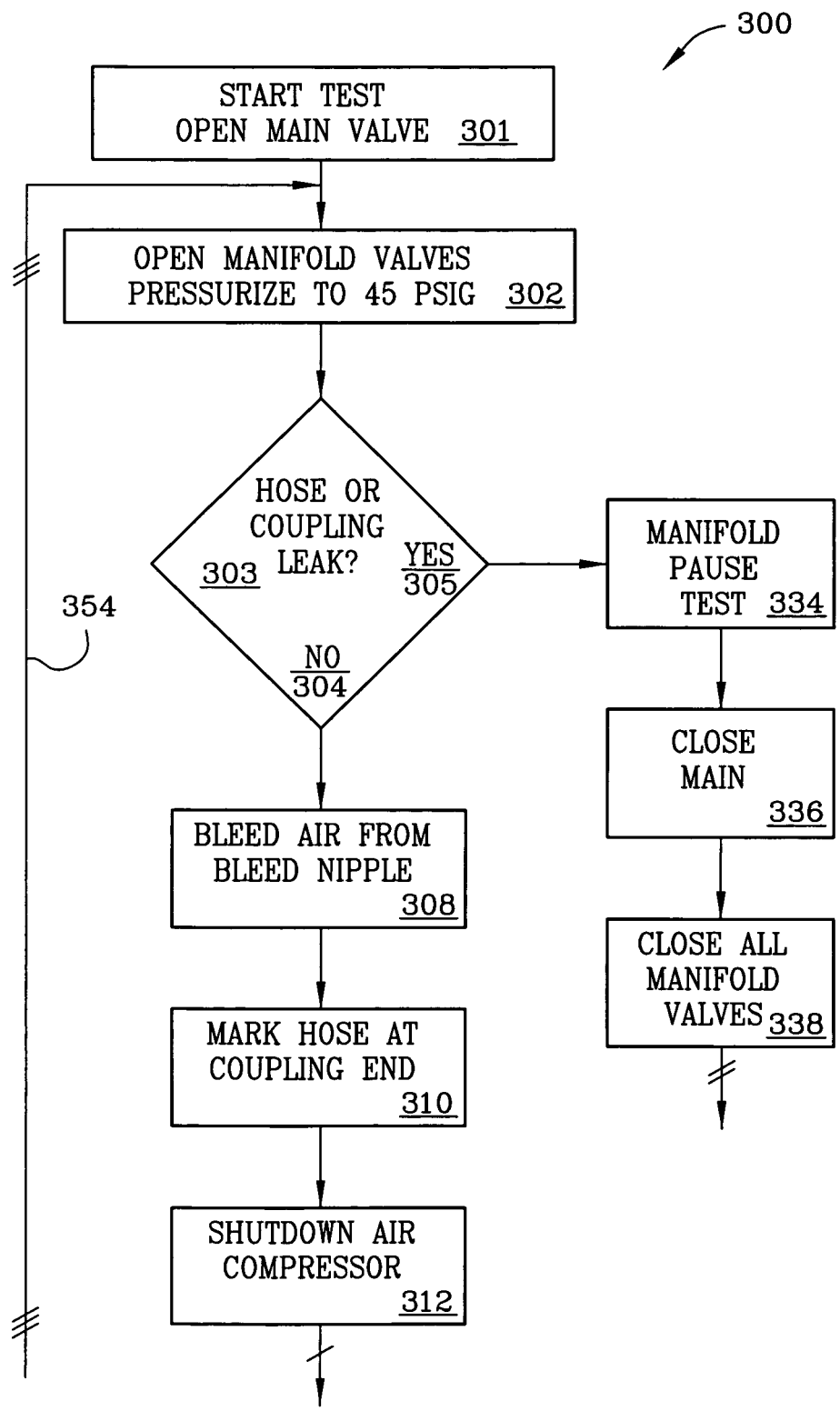
FIGS. 3, 3A, 3B and 3C illustrate a diagrammatic process flow chart.
Figure 3A:
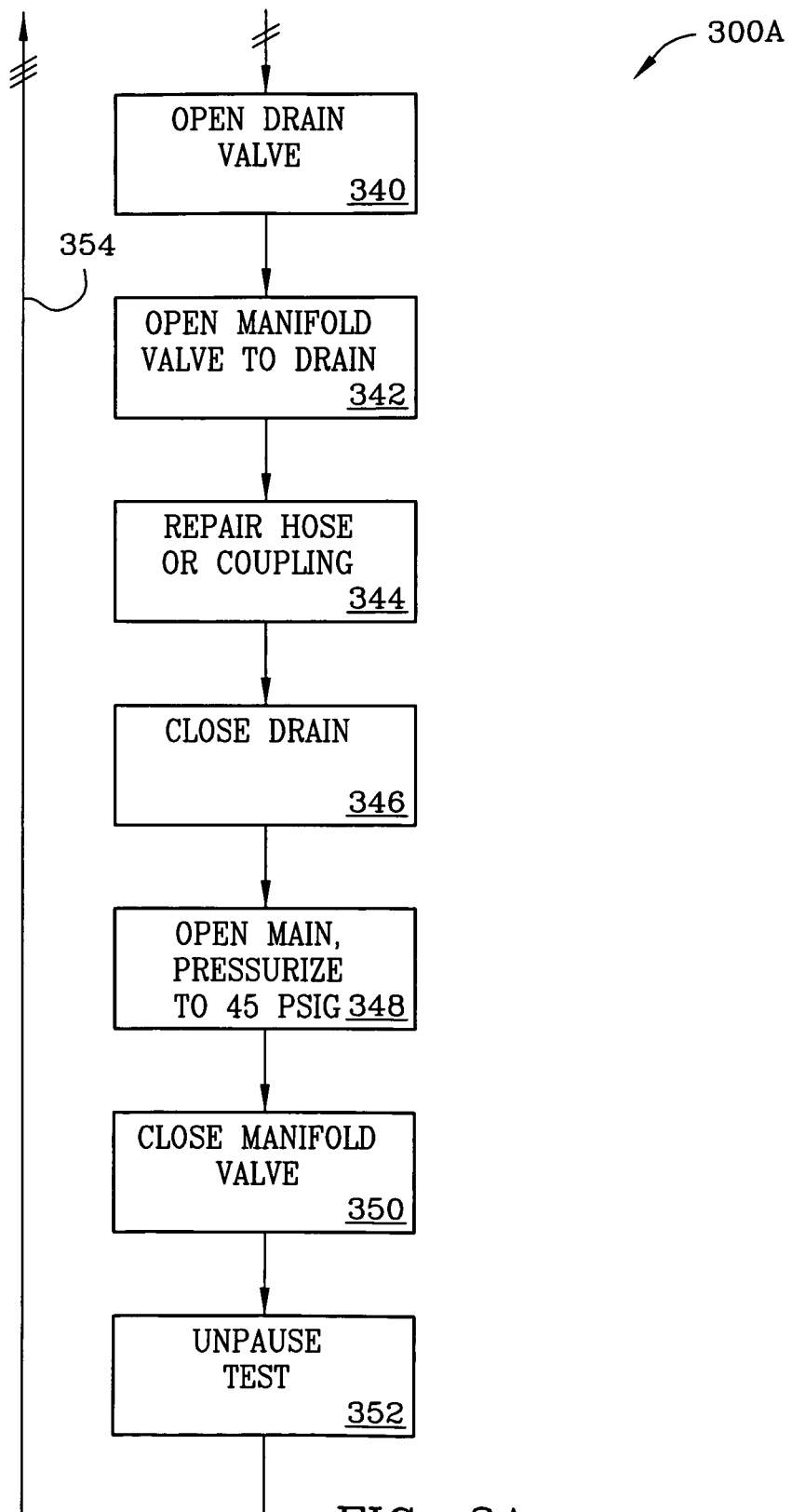
Figure 3B:
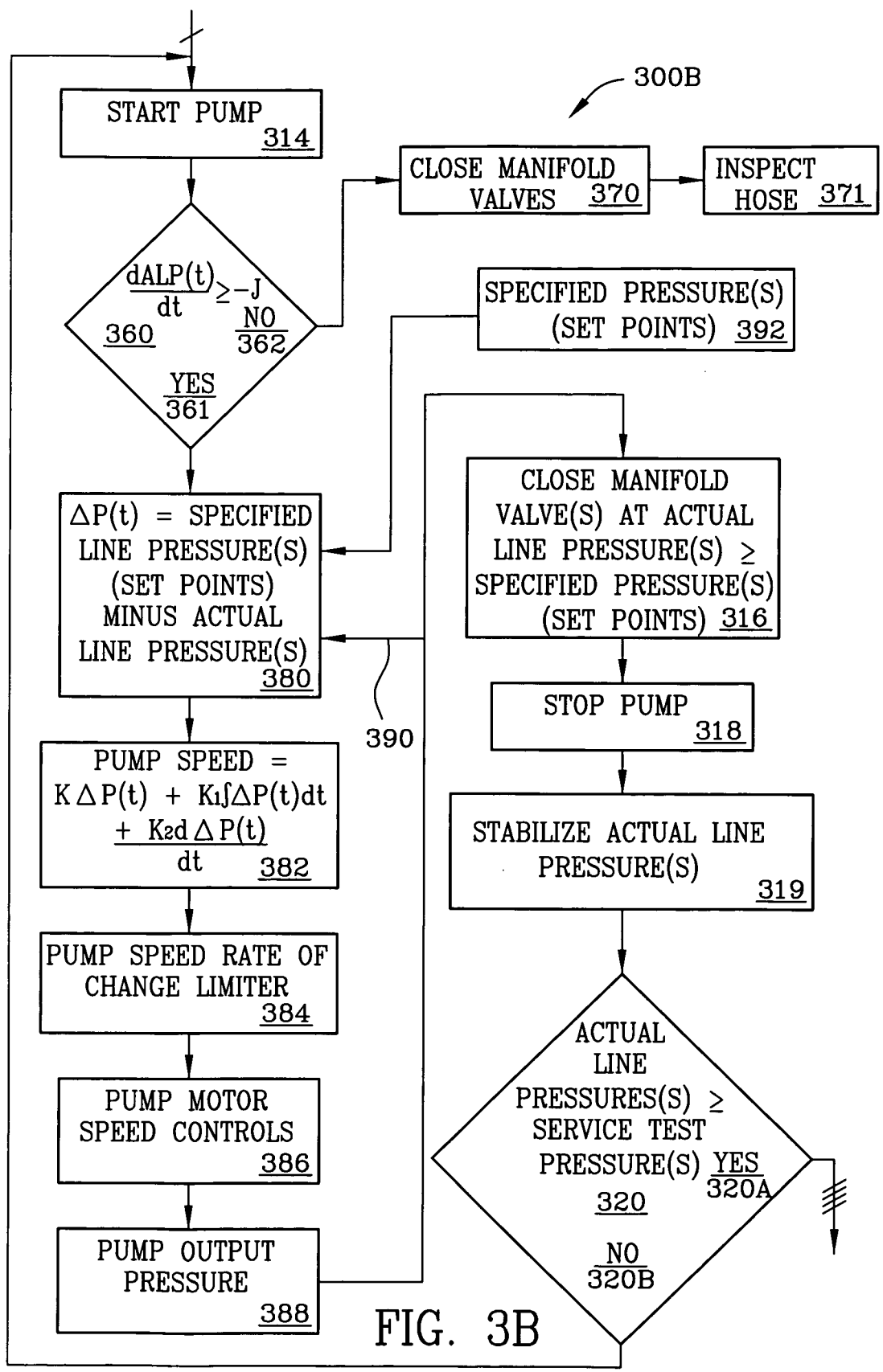
Figure 3C:
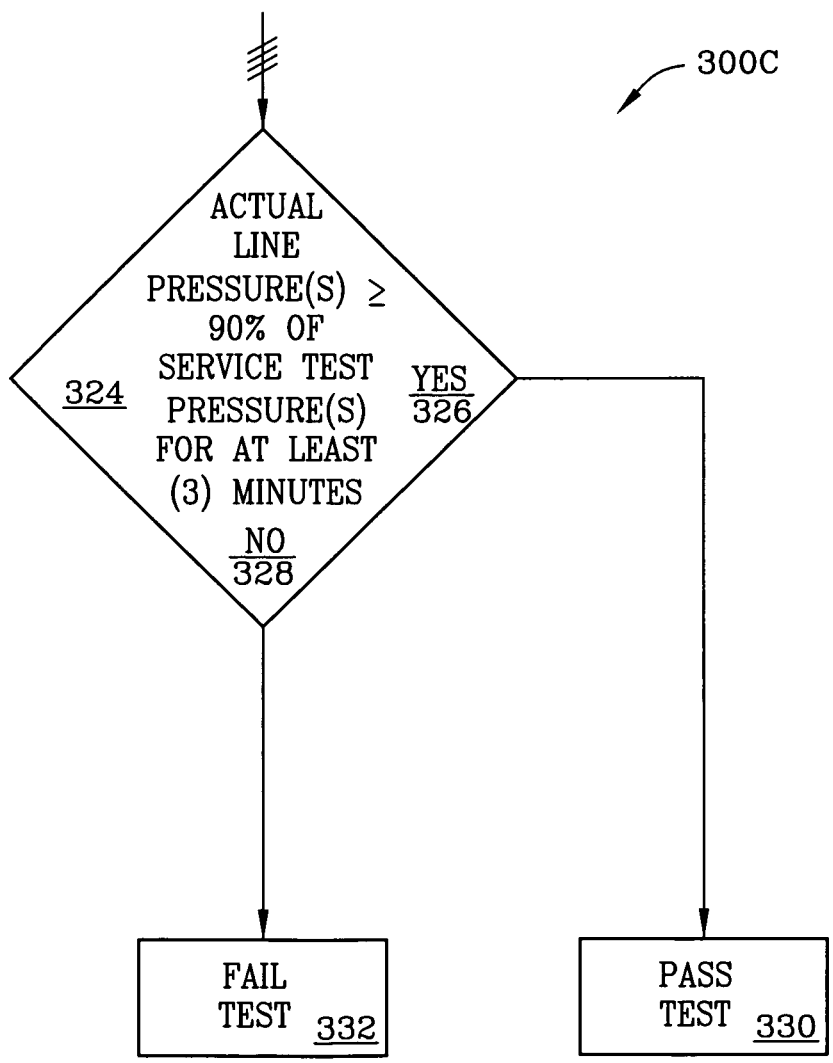

FIGS. 3, 3A, 3B and 3C illustrate a diagrammatic 300, 300A, 300B and 300C process flow chart. FIGS. 3, 3A, 3B and 3C do not represent all of the process steps employed but rather indicate cardinal points in the process. Referring to FIG. 3, to begin testing the fire hoses, the hoses must first be coupled to the respective fittings illustrated in FIGS. 1, 1B and 1F. Each of the hoses must be secured in a clamp 181 or in a rack restraining all the hoses so as to protect the test personnel in the event of a hose burst or blow out. In the low pressure test, the couplings/fittings are first marked with a bar code 171 or other identifying indicia. After removal of the protective cap 201B, the water inlet line 201 is coupled to a fire hydrant or some other water source (not shown). Flange 201A secures the pipe section 201 in the trailer. The main valve 203 is then opened 301 along with the manifold valves (isolation valves) 302. The hoses and couplings are checked for leaks at 45 psig+/−5 psi as indicated by reference numeral 303 in the process flow diagram. By checking for leaks it is meant that a visual check for leaks is made by test personnel. During the low pressure test, personnel may walk near the hose lines. However, during the service pressure test, personnel must stand at least 15 feet away from the leftmost hose when the hose field or array is viewed from the perspective of the trailer 120.

If a leak 305 is observed in a hose and/or a coupling of a hose, then the low pressure test is discontinued 334 and the main valve 203 and the manifold valves (isolation valves) are closed 336, 338. At this time the valves that are in the fittings at the end of the test lines are closed. The next step is to open the drain valve 340, 298, followed by the step of opening the manifold valves to drain 342, followed by the step of repairing the hose or coupling 344. Once the repair of the hose(s) or coupling(s) is made or the hose is removed, the step of closing the drain 346 is performed followed by the step of opening the main valve and pressurizing 348 the water header conduit 213 and pressurizing the branch test conduit and hose which was repaired. The isolation valve/manifold valve of the repaired line(s) is then closed 350. The test is then continued 352, 354 and all the manifold valves (isolation valves) are opened 302 and the process is repeated until all hoses are not leaking and all couplings are not leaking for a sufficient amount of time. If no leaks in the hoses or couplings are found as set forth in the process flow diagram by reference numeral 304, air is bled 308 from the valves 134 at the ends of the hoses and from the air bleed port (109B, 110B) on each of the fittings. Each hose is marked 310 in proximity to its fittings/couplings and the compressor is shutdown as indicated by reference numeral 312. If a large enough generator is used then it is not necessary to shutdown the air compressor as a condition precedent to the service pressure test. All valve manipulations are controlled by the controller 285 as stated previously herein and the position of each valve may be controlled in manual mode by the touch screen interface.

In the low pressure test, the couplings/fittings are first marked with a bar code 171 or other identifying indicia. See FIGS. 1C and 1D. The hoses are checked for leaks at 45 psig+/−5 psi. The hoses are coupled to a respective hose fitting 101-110 of a respective branch test conduit 214-223. Each of the branch test conduits includes an isolation valve 224-233, a pressure transducer 234-243 downstream of the isolation valve, and a hose fitting downstream of the isolation valve. Low pressure testing is performed on the hoses with the isolation valves open in the low pressure test. During the service pressure test the isolation valves are closed as described below in more detail. The branch test conduit and hose fittings are preferably made of metal which can be stainless or some other grade of steel. The isolation valve is preferably a ball valve with an air to open, spring to close actuator. The valve does not modulate, it is either fully open or fully closed. Water is supplied to a pressure reducing valve set to regulate pressure at 45 psig+/−5 psi. The pressure reducing valve 204 communicates with a water header conduit 213 which supplies water to and pressurizes the plurality of branch test conduits 214-223.

During the low pressure test, pressure in each of the branch test conduits and the hoses is measured while the isolation valve of each of the branch test conduits is open. During pressurization up to 45 psig+/−5 psi, if a given pressure transducer measures a sufficient pressure loss with respect to time in any of the branch test conduits and/or when a leak is visually observed in the hose, the isolation valve is closed. Once the low pressure test has been satisfactorily completed the service pressure test is performed.

Now, the hoses are ready to be tested nominally at 1.05 times their service test pressures. The requirement for the service pressure test is that each of the hose lines maintain a test pressure for a period of three (3) minutes. The process described herein takes the actual line pressure above the service test pressure by 5% and some degradation thereafter is permitted provided that the hose maintains an actual line pressure above the service test pressure. Pump 210 is started by the controller 285 and the controller receives actual line pressure signals from each of the transducers 234-243, 290, 291 and 292. Strobe annunciators as represented by A in FIG. 2 and the actual strobe lights 109A, 109B as indicated in FIG. 1 are provided for safety. Reference numeral 314 in the process flow diagram indicates the starting of the pump 210. The controller 285 takes the derivative of the line pressure with respect to time, namely, dALP(t)/dt and compares that value to a permitted decrease in the line pressure with respect to time, −J. In other words as long as the pressure is increasing in a given hose line with respect to time, or as long as pressure does not decrease too much in a given hose line with respect to time, the test continues. In other words as long as the relationship of dALP(t)/dt≥−J, is satisfied then the test continues as indicated by decisional diamond 360 and reference numeral 361. The test process disclosed herein allows a plurality of hoses to be simultaneously tested at specified pressures, or more accurately, at pressures at least equal to the service test pressure of the hose and up to a specified pressure or set point for the hose which is 1.05 times the service test pressure of the hoses.

The specified pressure (set point) is 1.05 times the service test pressure. Once the set point pressure is achieved, the hose goes through a three minute stabilization period if it is composed of section of hose which in total are 300 feet in length. During the stabilization period, depending on several factors such as the age of the hose, the size of the hose, the service test pressure of the hose, temperature of the water, temperature of the ambient air and the type of hose being tested, the hose expands and as it expands it changes its interior volume. As the volume of the hose increases the pressure therein tends to decrease. So, the present algorithm used in the controller pressurizes the hose to a pressure 5% higher than the service test pressure. If the derivative of the actual line pressure with respect to time is not greater than or equal to −J as indicated by reference numeral 362, the testing continues. A rate of pressure decrease greater than −J condition signifies a possible hose break or burst and the manifold valve (isolation valve) for the hose under test is quickly closed (if not already closed) and the hose is then inspected as indicated in steps 370 and 371. Applying this derivative pressure control algorithm protects test personnel which may be in the vicinity of the hose. It also protects the pump from wild swings on its curves as the system resistance goes down dramatically when a hose bursts or breaks.

If the derivative of the actual line pressures are satisfied then, on a hose by hose basis, beginning with the hose having the lowest specified pressure (1.05 times service test pressure), a proportional plus integral plus derivative algorithm 382 is applied to the pressure error signal, to with, the instantaneous difference of the specified pressure (set point 392) minus the actual line pressure 388, 390 as measured by the pressure transducer downstream of the isolation valve as indicated by reference numeral 380 in the process flow diagram. Pump speed is determined by the PID (proportional plus integral plus derivative) algorithm 382 which is generally in the form of: pump speed=$K\Delta P(t)+K_1\int \Delta P(t)+K_2 d/dt\ \Delta P(t)$ where K, $K_1$, and $K_2$ are scaling or weighting factors for each of the components of the algorithm. Biasing may be applied to the algorithm. The rate of change of pump speed output 382 is limited 384 by the controller such that the rate of change of the actual line pressure in the respective line does not exceed 15 psi/second resulting in an output pressure 388. Pump speed rate of change output limiter 384 transmits a speed command to the pump motor speed controls 386.

When the actual line pressure, to with, the output pressure for the hose line exceeds the specified pressure (and, in fact overshoots the set point) 316, then the manifold (isolation valve) closes and the pump is stopped 318. The pump will only be stopped if the hose line just described was the last hose line with the highest set point. In other words, the process can be thought of as a seamless step-wise service pressure test. Specifically, for example, if 10 hoses are being tested and each hose tested has a different service test pressure for fighting fires, for example, 100 psig, 125 psig, 150 psig, 175, psig, 200 psig, 225, psig, 250 psig, 275 psig, 300 psig, and 325 psig, the test apparatus and process will first satisfy the 100 psig conduit test branch by raising the actual line pressure from a starting point near 45 psig+/−5 psi (when the pump is first activated) at a controlled rate to 105 psig (1.05 times the service test pressure of 100 psig). At this time the isolation valves for all the test branches are open. When 105 psig (5% greater than the specified pressure, i.e., 1.05 times the service test pressure) is reached the isolation valve in the branch test conduit will close while the isolation valves for the other branch test conduits remain open communicating fluid to the other hoses being tested. Next, the controller seamlessly (simultaneously) in parallel commands a speed output to the motor to increase the speed to obtain the required specified pressure (set point) for the next hose to be tested, namely, approximately 131.25 psig (1.05 times service test pressure of 125 psig). The process is repeated until the specified pressures (set points) are satisfied in all of the hose lines. If a branch test conduit is not used, the set point will be entered as zero for the line and its isolation valve will remain closed during the low pressure test and the service pressure test.

Once the actual line pressure in the hose is sufficiently greater than the set point as sensed by the pressure transducer of the respective line downstream of the isolation valve, a stabilization period is commenced and continues for at least three minutes as indicated by reference numerals 319, 320 in the process flow schematic. The stabilization period provides the hose time to expand if it is going to expand.

If after the three minute stabilization period the actual line pressure is greater than or equal to the service test pressure 320A, then the hose line pressure test 324 commences for a period of three minutes. If the actual line pressure is greater than or equal to 90% of the service test pressure for a period of three minutes 326, the hose passes the test 330. If the actual line pressure is not greater than or equal to 90% of the service test pressure 392, 328 then the hose fails the test 332.

If the actual line pressure is not greater than or equal to the service test pressure during the stabilization period 320B, then the pump is restarted and the process steps 361, 380, 382, 384, 386, and 388 described above are repeated thus boosting the pressure in the respective hose line until the actual line pressure is greater than or equal to the set point 316. The pump 210 is then stopped 318 if there are no other hose lines requiring a pressure increase or boost and the hose is then stabilized for another three minute period. If the actual line pressure is greater than or equal to the service test pressure for at least three minutes 320A, then the service pressure test 334 is commenced again. If the actual line pressure is greater than or equal to service test pressure the hose passes the test 330 and if it does not the hose fails the test 332.

REFERENCE NUMERALS

A—schematic pressurization strobe light
LP—line pressure
−J—rate of decrease of line pressure
M—motor
100—perspective view of a vehicle trailer wherein hose fittings and elbows protrude from a side of the trailer
100A—enlargement of a portion of the fittings and alarms
100B—schematic of a trailer with the hose layout illustrating ten hose lines before pressurization thereof
100C—an enlargement of a portion of a hose in its depressurized state illustrating the coupling and an end portion of one of the hoses with an identifying bar code placed thereon
100D—an enlargement of a portion of a hose in its pressurized state illustrating the coupling and an end portion of one of the hoses with an identifying bar code placed thereon
100E—cross-sectional view 100E taken along the lines 1E-E of FIG. 1B
100F—a schematic of a trailer with the hose layout illustrating ten hose lines after pressurization thereof
100G—side view of one of the smaller diameter hoses in the pressurized state
100H—an enlarged portion FIG. 1F illustrating a section of hose
100I—a side view of one of the hose lines illustrating an adapter hose and hoses of different diameter interconnected together
101—hose fitting and elbow
101A—strobe annunciator
102—hose fitting and elbow
102A—strobe annunciator
103—hose fitting and elbow
103A—strobe annunciator
104—hose fitting and elbow
104A—strobe annunciator
105—hose fitting and elbow
105A—strobe annunciator
106—hose fitting and elbow
106A—strobe annunciator
107—hose fitting and elbow
107A—strobe annunciator
108—hose fitting and elbow
108A—strobe annunciator
109—hose fitting and elbow
109A—strobe annunciator
110—hose fitting and elbow
110A—strobe annunciator
111—drain conduit
120—trailer 131, 132, 133, 135, 136, 137—hose section
134—bleed fitting
171—bar code
180—surface, parking lot or unused road
172, 172A—coupling
199—adapter hose
200—a schematic of the control system illustrating the valving arrangement, pressure reducing valve, pressure sensors, controller and pump
200A—is a perspective view of the interior of the trailer illustrating the valving arrangement, pressure reducing valve, sensors and pump
200B—an enlargement of a portion of FIG. 2A illustrating two line valves (manifold valves) and pressure sensors
201—water inlet
201B—water inlet cap
202—water inlet to strainer
203—main valve
203A—main valve operator
204—pressure reducing valve
205—water inlet
206, 207—check valve
208—pump suction line
210—positive displacement pump
211—pressure relief valve
212—pump discharge line
213—pump discharge header
214, 215, 216, 217, 218, 219, 220, 221, 222, 223—branch conduit or manifold conduit
224, 225, 226, 227, 228, 229, 230, 231, 232, 233—branch or manifold valves
224A, 225A, 226A, 227A, 228A, 229A, 230A, 231A, 232A, 233—air to open spring to close valve operators
234, 235, 236, 237, 238, 239, 240, 241, 242, 243, 290, 291, 292—pressure transducers
243A—air compressor
257—electrical/electronic lines
265—air header
285—controller
294—in-line strainer
298—drain valve
298A—drain valve operator
299—drain valve line
300, 300A, 300B, 300C—diagrammatic flow chart
301—start test open main valve
302—open manifold valves pressurize to 45 psig+/−5 psi
303—hose or coupling leak
304—no
305—yes
308—bleed air from nipple
310—mark hose
312—shut down air compressor
314—start pump
316—close manifold valve(s) at line pressure greater than or equal to test pressure
318—stop pump
319—stabilize line pressure for at least (3) minutes
320—all line pressures greater than or equal to test pressure
320A—yes
320B—no
324—actual pressure in each line greater than or equal to line pressure(s) (set points) for for at least (3) minutes
326—yes
328—no
330—pass test
332—fail test
334—manifold pause test
336—close main
338—close all manifold valves
340—open drain valve
342—open manifold valve to drain
344—repair hose or coupling
346—close drain
348—open main pressurize to 45 psig+/−5 psi
350—close manifold valve
352—unpause test
354—initialize low pressure test
360—derivative of line pressure with respect to time is greater than or equal to minus J
361—yes
362—no
370—close manifold (isolation valve)
371—inspect hose
380—differential pressure, ΔP, equals (LP) line pressures minus actual line pressures(s)
382—pump speed equals KΔP(t) plus $K_1 \int \Delta P(t)$ plus $K_2 d/dt\ \Delta P(t)$
384—pump speed rate of change limiter
386—pump motor speed controls
388—pump output pressure
390—feedback pump output pressure signal
400—illustrates pump curves for various operating pressures
401—200 psi
402—500 psi Those skilled in the art will recognize that the invention has been set forth by way of examples. Accordingly, those skilled in the art will recognize that changes may be made to the examples without departing from the spirit and scope of the appended claims.

The invention claimed is:

1. A method for testing a plurality of fire hoses, each of said hoses required to maintain a test pressure for a specified duration, said test pressure proportional to a service test pressure, comprising the steps of:
affixing a plurality of hoses to branch test conduits, each of said branch test conduits includes a manifold valve, said branch test conduits communicating with a water header conduit;
interconnecting said water header conduit with a water pressure source;
opening a main valve in said water header conduit;
opening said manifold valves in each of said branch test conduits;
pressurizing, using a pressure reducing valve, said water header conduit, said branch test conduits and said hoses to 45 psig plus or minus 5 psig;
checking for hose or coupling water leaks;
if a hose or coupling water leak occurs: close said main valve and said manifold valves followed by opening a drain valve interconnected with said water header conduit followed by opening said manifold valves; repairing said hose or coupling and closing said drain valve followed by opening said main valve and pressurizing, using a pressure reducing valve, said water header conduit, said branch test conduits and said hoses to 45 psig plus or minus 5 psig followed by checking for hose or coupling leaks and repeating this step if a hose or coupling leak occurs;
if a hose or coupling leak is not found, then bleed air from the bleed nipple at the end of each hose line and mark said hose at the coupling end;
starting and running a variable frequency variable speed drive and a positive displacement pump;

monitoring and measuring an actual hose pressure of each of said hoses and taking the derivative of said actual hose pressure with respect to time to ensure that said derivative is greater than or equal to a predetermined negative value;

if said derivative of said actual hose pressure with respect to time is not greater than or equal to said predetermined negative value, then close said manifold valves and inspect said hoses and hose couplings for leaks, discontinue operation of said variable frequency variable speed drive and said positive displacement pump;

if leaks in said hoses or hose couplings are found, repeat said steps of: if a hose or coupling water leak occurs and all the subsequent steps;

if said derivative of said actual hose pressure with respect to time is greater than or equal to said predetermined negative value, then compare specified pressures of each hose with said actual hose pressures forming pressure differences;

entering said pressure differences into said controller, said controller operating on said differences according to an algorithm, said controller outputting a pump speed command;

rate limiting said pump speed command;

outputting said rate limited pump speed command to a pump motor speed control;

outputting a pressure from said positive displacement pump;

closing said manifold valves at actual hose pressures greater than or equal to said specified pressures for each said hose;

stopping said variable frequency variable speed drive and said positive displacement pump;

stabilizing said actual hose pressures for a stabilizing period of time allowing said hoses to expand;

monitoring and comparing said actual hose pressures to said service test pressures at the end of said stabilizing period;

if said actual hose pressures are not greater than or equal to said service test pressures, then restart said variable frequency variable speed drive and said positive displacement pump to boost pressure and repeat said steps of: monitoring and measuring said actual pressure of each of said hoses and taking the derivative of said pressure with respect to time to ensure that said derivative is greater than or equal to a predetermined negative value and all subsequent steps;

if said actual hose pressures are greater than or equal to said service test pressures then monitor said actual hose pressures for a period of time to ensure that said actual hose pressures remain above a predetermined percentage of said service test pressures;

if said actual hose pressures remain above said predetermined percentage of said service test pressures for said period of time, then said hose or hoses pass said test; and, if said actual hose pressures do not remain above said predetermined percentage of said service test pressure for said period of time, then said hose or hoses fail said test.

2. A method for testing a plurality of fire hoses, each of said hoses required to maintain a test pressure for a specified duration, said test pressure proportional to a service test pressure, comprising the steps of:

affixing a plurality of hoses to branch test conduits, each of said branch test conduits includes a manifold valve, said branch test conduits communicating with a water header conduit;

interconnecting said water header conduit with a water pressure source;

opening a main valve in said water header conduit;

opening said manifold valves in each of said branch test conduits;

pressurizing, using a pressure reducing valve, said water header conduit, said branch test conduits and said hoses to a predefined pressure plus or minus 5 psig;

checking for hose or coupling water leaks;

if a hose or coupling water leak occurs: close said main valve and said manifold valves followed by opening a drain valve interconnected with said water header conduit followed by opening said manifold valves; repairing said hose or coupling and closing said drain valve followed by opening said main valve and pressurizing, using a pressure reducing valve, said water header conduit, said branch test conduits and said hoses to a predefined pressure plus or minus 5 psig followed by checking for hose or coupling leaks and repeating this step if a hose or coupling leak occurs;

if a hose or coupling leak is not found, then bleed air from the bleed nipple at the end of each hose line and mark said hose at the coupling end;

starting and running a variable frequency variable speed drive and a positive displacement pump;

monitoring and measuring an actual hose pressure of each of said hoses and taking the derivative of said actual hose pressure with respect to time to ensure that said derivative is greater than or equal to a predetermined negative value;

if said derivative of said actual hose pressure with respect to time is not greater than or equal to said predetermined negative value, then close said manifold valves and inspect said hoses and hose couplings for leaks, discontinue operation of said variable frequency variable speed drive and said positive displacement pump;

if leaks in said hoses or hose couplings are found, repeat said steps of: if a hose or coupling water leak occurs and all the subsequent steps;

if said derivative of said actual hose pressure with respect to time is greater than or equal to said predetermined negative value, then compare specified pressures of each hose with said actual hose pressures forming pressure differences;

entering said pressure differences into said controller, said controller operating on said difference according to an algorithm, said controller outputting a pump speed command;

rate limiting said pump speed command;

outputting said rate limited pump speed command to a pump motor speed control;

outputting a pressure from said positive displacement pump;

closing said manifold valves at actual hose pressures greater than or equal to said specified pressures for each said hose;

stopping said variable frequency variable speed drive and said positive displacement pump;

stabilizing said actual hose pressures for a stabilizing period of time allowing said hoses to expand;

monitoring and comparing said actual hose pressures to said service test pressures at the end of said stabilizing period;

if said actual hose pressures are not greater than or equal to said service test pressures, then restart said variable frequency variable speed drive and said positive displacement pump to boost pressure and repeat said steps of:

monitoring and measuring said actual pressure of each of said hoses and taking the derivative of said pressure with respect to time to ensure that said derivative is greater than or equal to a predetermined negative value and all subsequent steps;

if said actual hose pressures are greater than or equal to said service test pressures then monitor said actual hose pressures for a period of time to ensure that said actual hose pressures remain above a predetermined percentage of said service test pressures;

if said actual hose pressures remain above said predetermined percentage of said service test pressures for said period of time, then said hose or hoses pass said test; and, if said actual hose pressures do not remain above said predetermined percentage of said service test pressure for said period of time, then said hose or hoses fail said test.

* * * * *

UNITED STATES PATENT AND TRADEMARK OFFICE
CERTIFICATE OF CORRECTION

PATENT NO.       : 8,554,497 B2  
APPLICATION NO.  : 12/057342  
DATED            : October 8, 2013  
INVENTOR(S)      : Hamilton et al.

Page 1 of 1

It is certified that error appears in the above-identified patent and that said Letters Patent is hereby corrected as shown below:

In the Specification:

Col. 9, line 1, after "view" delete "1001" and insert --100I-- therefor.

Col. 15, line 21, after "to" delete "with" and insert --wit-- therefor.

Signed and Sealed this
Eleventh Day of February, 2014

Michelle K. Lee
*Deputy Director of the United States Patent and Trademark Office*